(12) United States Patent
Onoda et al.

(10) Patent No.: US 12,229,400 B2
(45) Date of Patent: *Feb. 18, 2025

(54) HANDWRITING INPUT DEVICE

(71) Applicant: Wacom Co., Ltd., Saitama (JP)

(72) Inventors: Naoto Onoda, Saitama (JP); Kenichi Okawa, Saitama (JP)

(73) Assignee: Wacom Co., Ltd., Saitama (JP)

( * ) Notice: Subject to any disclaimer, the term of this patent is extended or adjusted under 35 U.S.C. 154(b) by 0 days.

This patent is subject to a terminal disclaimer.

(21) Appl. No.: 18/539,970

(22) Filed: Dec. 14, 2023

(65) Prior Publication Data

US 2024/0111413 A1    Apr. 4, 2024

Related U.S. Application Data

(63) Continuation of application No. 17/732,246, filed on Apr. 28, 2022, now Pat. No. 11,880,563, which is a (Continued)

(30) Foreign Application Priority Data

Dec. 17, 2019   (JP) ................................ 2019-227249

(51) Int. Cl.
*G06F 3/04883* (2022.01)
*G02F 1/1333* (2006.01)
(Continued)

(52) U.S. Cl.
CPC ...... *G06F 3/04883* (2013.01); *G02F 1/13338* (2013.01); *G06F 3/03545* (2013.01);
(Continued)

(58) Field of Classification Search
CPC .. G06F 3/04883; G06F 3/03545; G06F 3/046; G06F 3/04162; G06F 3/0383; G06F 2203/04107; G02F 1/13338
See application file for complete search history.

(56) References Cited

U.S. PATENT DOCUMENTS 5,793,360 A * 8/1998 Fleck ...................... G06F 3/023
345/157
6,625,583 B1 * 9/2003 Silverman ........... G06F 3/04883
705/37
(Continued)

FOREIGN PATENT DOCUMENTS

JP    2009252048 A  * 10/2009
JP    2015001751 A  *  1/2015 ......... G06F 3/03545
(Continued)

OTHER PUBLICATIONS

International Search Report, mailed Dec. 8, 2020, for International Application No. PCT/JP2020/042543, 4 pages.

*Primary Examiner* — Amare Mengistu
*Assistant Examiner* — Jennifer L Zubajlo
(74) *Attorney, Agent, or Firm* — Seed IP Law Group LLP

(57) ABSTRACT

A handwriting input device includes a display section which includes a display surface and which, in operation, displays handwritten input information that is handwritten on the display surface, a position detection sensor which is disposed such that a position detection area of the position detection sensor is superimposed on a display area of the display surface and which, in operation, detects a position corresponding to the handwritten input information, a memory which, in operation, stores electronic data according to the position that corresponds to the handwritten input information and that has been detected by the position detection sensor, a transmission circuit which, in operation, transmits the electronic data stored in the memory to an external device, and a control circuit which, in operation, controls the transmission of the electronic data stored in the memory to the external device via the transmission circuit.

20 Claims, 10 Drawing Sheets

Related U.S. Application Data continuation of application No. PCT/JP2020/042543, filed on Nov. 16, 2020.

(51) Int. Cl.
| | | |
|---|---|---|
| *G06F 3/0354* | (2013.01) | |
| *G06F 3/046* | (2006.01) | |
| G06F 3/038 | (2013.01) | |
| G06F 3/041 | (2006.01) | |

(52) U.S. Cl.
CPC ............ G06F 3/046 (2013.01); *G06F 3/0383* (2013.01); *G06F 3/04162* (2019.05); *G06F 2203/04107* (2013.01)

(56) References Cited

U.S. PATENT DOCUMENTS

| | | | |
|---|---|---|---|
| 2014/0043547 A1* | 2/2014 | Marhefka | G06F 3/038 349/12 |
| 2014/0368453 A1 | 12/2014 | Yamaguchi et al. | |
| 2015/0124178 A1* | 5/2015 | Khan | G06F 3/0321 349/12 |
| 2015/0278983 A1* | 10/2015 | Uefuji | G09G 5/003 345/173 |
| 2018/0067913 A1* | 3/2018 | Takesue | G06F 3/04883 |

FOREIGN PATENT DOCUMENTS

| | | | |
|---|---|---|---|
| JP | 2015-197795 A | 11/2015 | |
| JP | 2017-504814 A | 2/2017 | |
| JP | 2018-037033 A | 3/2018 | |

\* cited by examiner

HANDWRITING INPUT DEVICE

BACKGROUND

Technical Field

The present disclosure relates to a handwriting input device.

Description of the Related Art

To meet demands for paperless environments, it has become increasingly common to use, rather than writing instruments such as ball-point pens and pencils to handwrite something on paper, an electronic pen to input handwriting to an input device, thereby storing handwritten information that is input with the electronic pen as electronic data. An example of such an input device is a tablet terminal including a position detection device section that includes a position detection sensor for detecting the position indicated by the electronic pen.

In this case, the handwritten information input with the electronic pen is required to be visually confirmed by the user. For this purpose, a tablet terminal includes not only a display panel superimposed on the position detection sensor but also a display control circuit. Under the control of the display control circuit, a display image (a written trace or the like) corresponding to coordinate data of the position indicated by the electronic pen and detected by the position detection device section is displayed on the display panel to allow the user's visual confirmation.

In this case, a liquid crystal display (LCD) or an organic electroluminescence (EL) display is used as the display panel.

However, the tablet terminal described above presents a high-cost problem because the tablet terminal needs to include the display control circuit as well as the display panel, which displays handwritten information according to coordinate information of the position indicated by the electronic pen and detected by the position detection device section.

For example, Japanese Patent Laid-Open No. 2018-37033 (hereinafter referred to as "Patent Document 1") discloses a handwriting input device including a board device and an electronic pen. The board device includes a plate-like board, inside which a position detection device section including a position detection sensor is housed and on which paper can be clipped so as to be superimposed on the position detection sensor. The electronic pen includes a writing instrument function such as a ballpoint pen function and interacts with the position detection sensor through signals.

In this handwriting input device, when a handwritten input is made on paper by using the writing instrument function of the electronic pen (e.g., the ballpoint pen function), the position detection device section detects coordinate information of the written trace of the handwritten input through the position detection sensor. The detected coordinate information is then output to, for example, a personal computer (PC) or the like and used therein.

According to this handwriting input device, the written trace of the handwritten input made by using the writing instrument function of the electronic pen is drawn on paper. As such, this configuration eliminates the need for the above-described display panel that displays the handwritten information for the user's confirmation and, accordingly, is very convenient and lowers cost.

However, the handwriting input device disclosed in Patent Document 1 has a problem in that the electronic pen needs to have the writing instrument function such as the ballpoint pen function separately from the electronic pen function. This complicates the configuration of the electronic pen and increases the cost in this regard. Moreover, although the handwriting input device disclosed in Patent Document 1 is indeed convenient in a usage case where paper on which the written trace of a handwritten input is drawn is to be stored, the user may find it cumbersome to have to replace paper each time in a usage case where it is not required to store all the paper.

Display boards are known which support a handwritten input. Such display boards can display information (image information) such as a handwritten character and a hand-drawn image on a display surface and electrically erase the displayed information. For example, display boards that use pressure-sensitive cholesteric liquid crystal are already commercially available (e.g., a pressure-sensitive cholesteric liquid crystal tablet "Boogie Board (registered trademark)" made by Improv Electronics).

This display board has an advantage in that, by pressing a button that applies a low-voltage pulse voltage to a cholesteric liquid crystal layer the user can instantly erase all images displayed on the display surface at once. That is, the pressing of the button has a similar effect to the replacement of paper.

Moreover, this display board eliminates the need for an electronic pen to have the writing instrument function disclosed in Patent Document 1 because the display board can display handwritten input information on the display surface when the pen tip of the electronic pen applies a pressure to a first substrate, that is, when a written input or a drawn input is made.

In view of this, by combining this type of display board with a position detection sensor that detects the position indicated by the electronic pen, a handwriting input device may be realized which does not require replacing paper as required with the handwriting input device of Patent Document 1 and which does not require the electronic pen to have the writing instrument function.

This handwriting input device includes a memory that temporarily stores electronic data corresponding to writing or drawing made on the display board by the electronic pen and detected by the position detection sensor, and transfers the electronic data stored in the memory to an external device such as a PC at an appropriate timing. The electronic data includes, for example, coordinate data corresponding to the position on the display surface where writing or drawing is made by the electronic pen as well as pen-pressure data at that position.

It is important for this type of handwriting input device to be able to manage display information on one page of the display board in association with electronic data corresponding to the display information, but how to achieve this can be challenging.

For example, if an erasure operation button for erasing the above-described display information and a transmission button for transmitting the electronic data stored in the memory are provided separately, there is a possibility that the display information corresponding to one page may lose the correspondence with the electronic data stored in the memory to be transmitted. More specifically, assume that the user erases the display information on the display surface by operating the erasure operation button, and then starts a handwritten input on the display board before transmitting the electronic data. In this case, new electronic data corresponding to the new input image is stored in the memory in such a way that the new electronic data is superimposed on the electronic data corresponding to the image on the previous page.

Further, there may be cases where the user, after erasing the information displayed on the display surface by operating the erasure operation button, forgets to operate the transmission button. There may also be cases where the user has erased the electronic data stored in the memory, believing that the user has transmitted the electronic data stored in the memory by operating the transmission button, but the transmission data has not actually reached the destination PC because of a connection problem or a communication failure with the destination PC. This would result in the loss of the electronic data corresponding to the information displayed on the display board, making it impossible to restore the electronic data.

BRIEF SUMMARY

Therefore, it is desirable to provide a handwriting input device that can reliably manage information displayed according to a handwritten input in association with electronic data corresponding to the information.

In order to solve the problems described above, there is provided a handwriting input device including a display section which includes a display surface and which, in operation, displays handwritten input information that is handwritten on the display surface, a position detection sensor which is disposed such that a position detection area of the position detection sensor is superimposed on a display area of the display surface and which, in operation, detects a position corresponding to the handwritten input information, a memory which, in operation, stores electronic data according to the position that corresponds to the handwritten input information and that has been detected by the position detection sensor, a transmission circuit which, in operation, transmits the electronic data stored in the memory to an external device, and a control circuit which, in operation, controls the transmission of the electronic data stored in the memory to the external device via the transmission circuit. The display section is configured to, in operation, display the handwritten input information on the display surface in response to a handwritten input operation performed on the display surface, and be capable of visually erasing all handwritten input information displayed on the display surface at once in response to a predetermined operation by a user. The control circuit is configured to, in operation, check whether or not the transmission to the external device via the transmission circuit is possible and, when the transmission to the external device is possible, transmit, in response to the predetermined operation, the electronic data stored in the memory to the external device via the transmission circuit and erase the electronic data from the memory after the transmission.

In the handwriting input device having the above-described configuration, in response to the user making a handwritten input on the display surface, handwritten input information corresponding to the handwritten input is displayed on the display surface. Any handwritten input information displayed on the display surface can be visually erased all at once in response to the predetermined operation by the user.

Since the position detection sensor is disposed so as to be superimposed on the display area of the display surface of the display section, the position corresponding to the user's handwritten input is detected by the position detection sensor, and electronic data based on the information corresponding to the detected position is stored in the memory.

When the predetermined operation for visually erasing any handwritten input information displayed on the display section is performed by the user, the control circuit transmits the electronic data stored in the memory to the external device via the transmission circuit if the transmission to the external device via the transmission circuit is possible. After the transmission, the control circuit erases the electronic data stored in the memory.

According to the handwriting input device having the above-described configuration, in response to the predetermined operation performed for visually erasing any handwritten input information displayed on the display surface, electronic data stored in the memory is transmitted to the external device and then erased after the transmission. Therefore, when a new handwritten input is subsequently made on the display surface, the previous electronic data corresponding to the previous handwritten input information has already been erased and does not exist in the memory. This configuration prevents new electronic data corresponding to the new handwritten input information from being superimposed on the previous electronic data corresponding to the previous handwritten input information.

Moreover, the external device can easily manage the electronic data transmitted in response to the predetermined operation performed on the handwriting input device as the electronic data corresponding to the handwritten input information displayed on the display surface of the handwriting input device. For example, the external device can manage the electronic data on a page-by-page basis by assigning a page number to the electronic data.

DETAILED DESCRIPTION

A handwriting input device according to embodiments of the present disclosure will be described below with reference to the drawings.

First Embodiment

Figure 1:
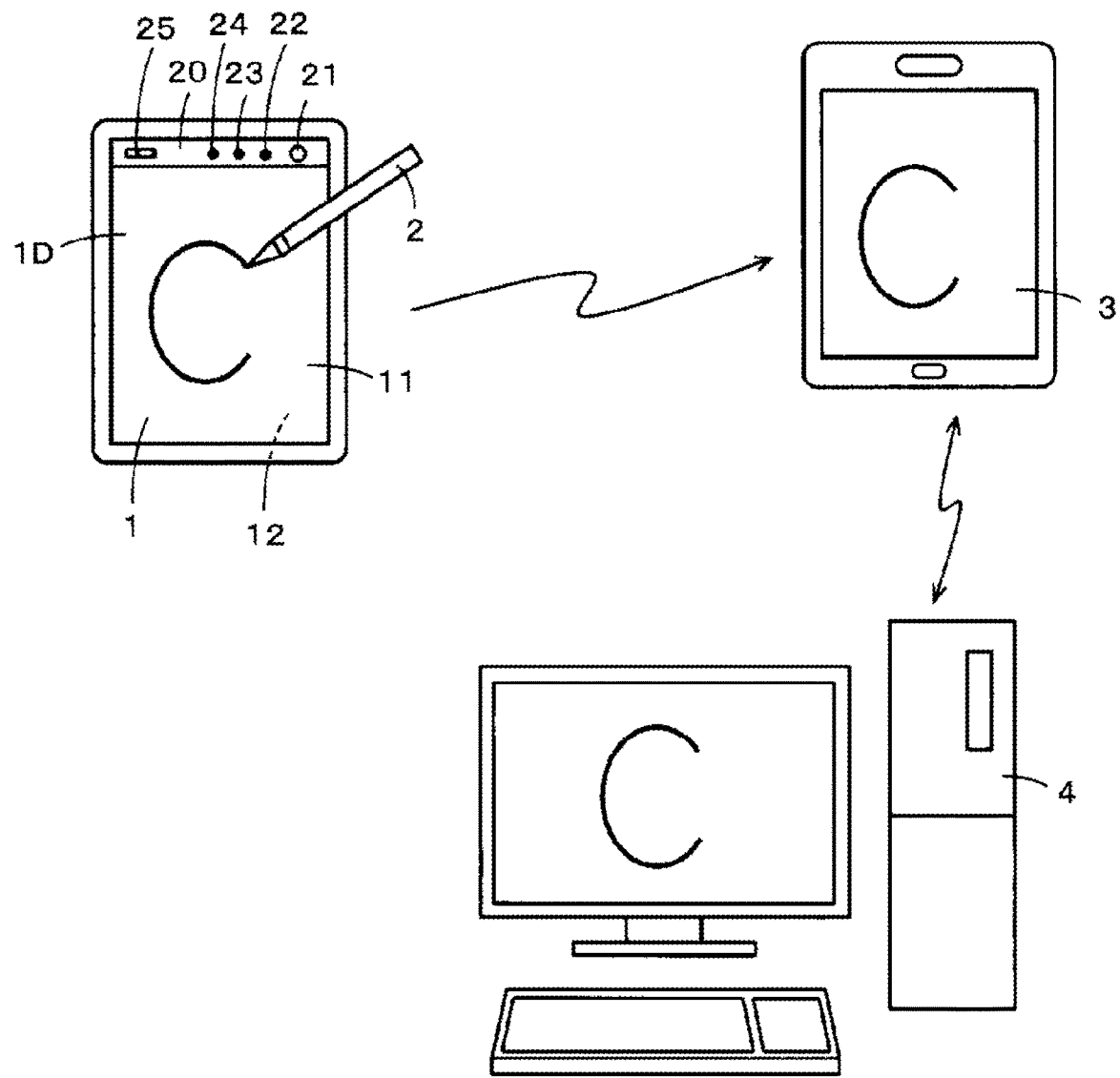
FIG. 1 is a diagram for describing an example of a configuration of a system using a handwriting input device according to a first embodiment of the present disclosure.

FIG. 1 is a diagram illustrating an overview of an example of a configuration of a handwritten information management system including a handwriting input device according to an embodiment of the present disclosure. The handwritten information management system includes a handwriting input device 1 according to a first embodiment of the present disclosure, an electronic pen 2, which is used to input handwritten information to the handwriting input device 1, a mobile terminal 3, which can communicate with the handwriting input device 1, and a personal computer (hereinafter referred to as a "PC") 4, which can communicate with the mobile terminal 3 and constitutes a server device for managing handwritten input information.

The handwriting input device 1 accepts handwritten input information that is handwritten by the user with the electronic pen 2. The handwriting input device 1 has a function of visually presenting (displaying) the handwritten input information to the user as an image such as a written trace image or a drawn image. The handwriting input device 1 also has functions of generating electronic data corresponding to the handwritten input information, temporarily storing the electronic data in a memory, and transferring the electronic data stored in the memory to the mobile terminal 3 at an appropriate timing.

The handwriting input device 1 has a thin rectangular plate-like appearance. FIGS. 3A to 3D are exploded configuration diagrams for describing an example of a hardware configuration of the handwriting input device 1 according to the first embodiment. As illustrated in FIGS. 3A to 3D, the handwriting input device 1 includes a display board section 11 (FIG. 3A), a position detection sensor 12 (FIG. 3B), which detects the position indicated by the electronic pen 2, a shield sheet 13 (FIG. 3C), and a case 14 (FIG. 3D), in order from the top in a direction orthogonal to an upper surface where a handwritten input is made.

The case 14 is formed of, for example, a synthetic resin or metal and has a thin box shape having a storage space 14a. The storage space 14a has an opening on the upper side thereof. The display board section 11, the position detection sensor 12, and the shield sheet 13 are housed on top of each other inside the storage space 14a of the case 14.

The display board section 11 is an example of a display section and includes a display surface 11D, which displays information, such as user's handwritten or hand-drawn information, as an image in response to a physical phenomenon change corresponding to the handwritten input. In the following description, information displayed on the display surface 11D will be referred to as an image displayed on the display surface 11D.

When a predetermined operation is performed on the handwriting input device 1, any images displayed on the entire display area of the display surface 11D of the display board section 11 are visually erased all at once.

Figure 2:
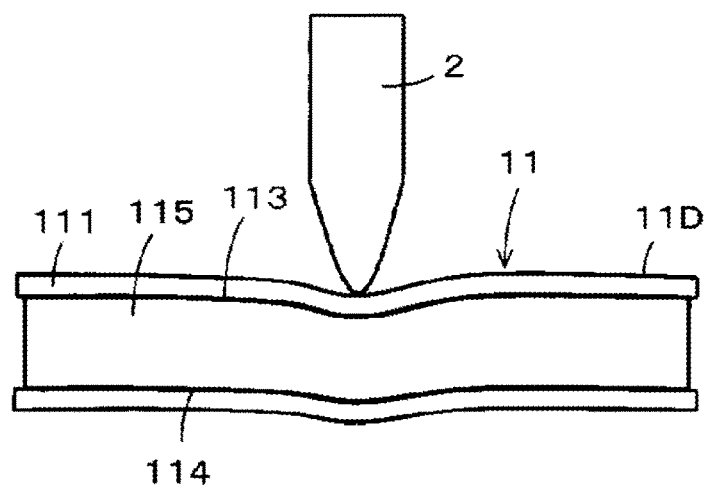
FIG. 2 is a view for describing an example of a configuration of a display section of the handwriting input device according to the first embodiment of the present disclosure.

In the first embodiment, the display board section 11 includes a pressure-sensitive cholesteric liquid crystal layer. FIG. 2 is a sectional view of a section of the display board section 11. The display board section 11 includes two flexible transparent substrates 111 and 112, which are disposed with a predetermined gap therebetween. Electrodes 113 and 114 are disposed on opposing surfaces of the two flexible transparent substrates 111 and 112, respectively. Further, a pressure-sensitive cholesteric liquid crystal layer 115 rests in a gap between the respective electrodes 113 and 114 of the two transparent substrates 111 and 112. In this example, the display surface 11D is an upper surface of the transparent substrate 111. Therefore, the pressure-sensitive cholesteric liquid crystal layer 115 rests so as to face the display surface 11D.

In this display board section 11, as illustrated in FIG. 2, when a pressure is applied to the display surface 11D by a pen tip of the electronic pen 2 or the like, the flexible transparent substrates 111 and 112 deform, causing a change in the arrangement of liquid crystal molecules of the pressure-sensitive cholesteric liquid crystal layer 115 in accordance with the applied pressure. This, in turn, causes a change in the reflectance of the liquid crystal at the position where the applied pressure causes the change in the arrangement. Accordingly, the handwritten input information is formed and retained as a visible image in the display board section 11 and appears as a visually recognizable image on the display surface 11D. By utilizing the change in the reflectance of the liquid crystal at the position where the pressure is applied, the display board section 11 forms an image, displaying the image on the display surface 11D without consumption of power. The image is persistent due to the bistable nature of the liquid crystal. Note that the display board section 11 can form and display an image even when something other than the electronic pen 2 is used to apply a pressure to the display surface 11D.

When a low pulse voltage is applied between the electrodes 113 and 114 of the display board section 11, the liquid crystal molecules of the pressure-sensitive cholesteric liquid crystal layer 115 are aligned to a predetermined arrangement. Accordingly, any images retained on the display surface 11D are visually erased all at once.

The position detection sensor 12 is, in this example, disposed on a back side of the display board section 11 such that a position detection area of the position detection sensor 12 is superimposed on the display area of the display surface 11D. Therefore, the display surface 11D of the display board section 11 also serves as an input surface where a position indication input is made to the position detection sensor 12.

The position detection sensor 12 detects the position of the pen tip of the electronic pen 2 in response to a handwritten input. By using the detected position coordinates as time-series data, a position detection circuit 30, to be described later, generates electronic data corresponding to the handwritten input information. In this example, the position detection sensor 12 is a position detection sensor of an electromagnetic induction type and includes a large number of loop coils that transmit and receive signals to and from the electronic pen 2. The configuration of the position detection sensor 12 will be described in detail later.

The shield sheet 13 is a sheet in which an electromagnetic sheet formed of a magnetic material is laminated on a conductive sheet formed of, for example, indium tin oxide (ITO), zinc oxide, tin oxide, or the like. The shield sheet 13 functions to prevent unnecessary signals from entering the position detection sensor 12 and to eliminate leakage of magnetic flux generated by the position detection sensor 12. The shield sheet 13 is disposed so as to cover the entire surface of the position detection sensor 12 on the side opposite to the display surface 11D side, which also serves as the indication input surface.

Figure 3A:
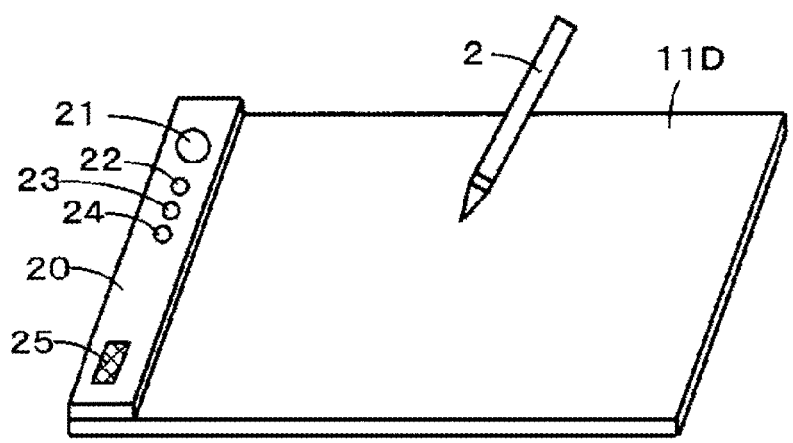
FIGS. 3A to 3D are exploded perspective diagrams for describing an example of a configuration of the handwriting input device according to the first embodiment of the present disclosure.
Figure 3B:
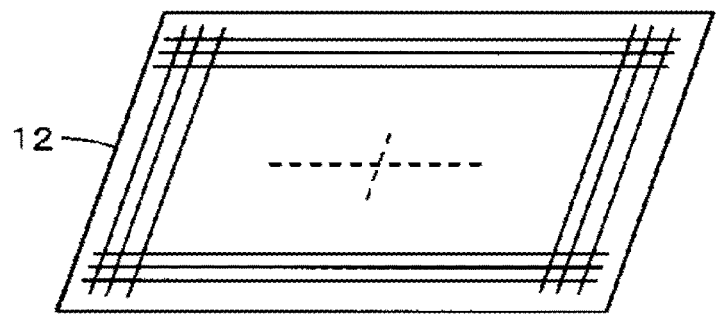
Figure 3C:
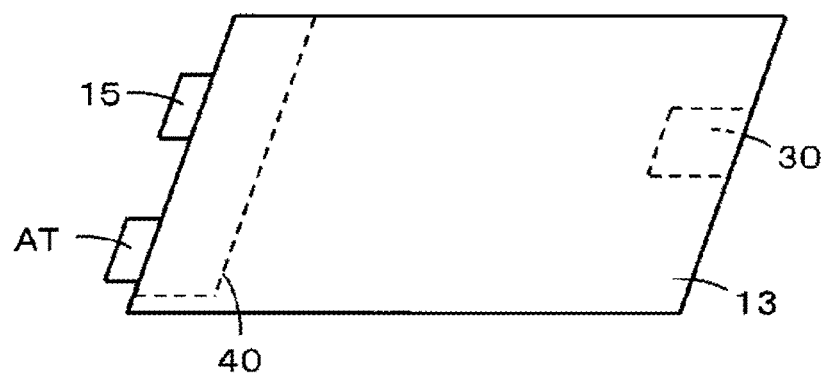
Figure 3D:
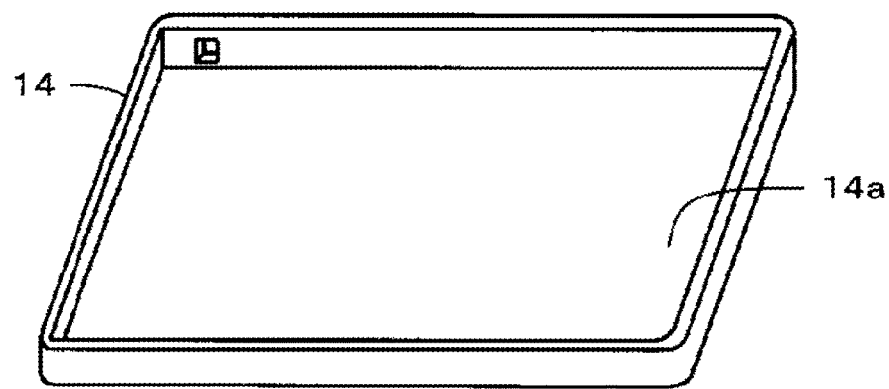

As illustrated in FIG. 3C together with the shield sheet 13, the position detection circuit 30 and a device control circuit 40, which constitute electronic circuitry, are disposed on a side of the shield sheet 13 opposite to the position detection sensor 12 side. The position detection circuit 30 generates electronic data including, for example, coordinate data and pen-pressure information of the position indicated by the electronic pen 2 according to the output from the position detection sensor 12.

The device control circuit 40 implements control functions for temporarily storing the electronic data generated by the position detection circuit 30 in the memory and transmitting the stored electronic data to the mobile terminal 3 at an appropriate timing. For this purpose, as described later, the device control circuit 40 includes the memory and a transmission circuit. Further, a transmission antenna AT is provided for the transmission circuit. In this example, the transmission circuit is configured as a communication section that performs near field communication in accordance with the Bluetooth (registered trademark) standard. The handwriting input device 1 and the mobile terminal 3 communicate with each other through a wireless communication channel using the near field communication. The transmission antenna AT is disposed outside the area covered by the shield sheet 13 so that electronic data can be properly transmitted to the mobile terminal 3.

The device control circuit 40 includes an erasure circuit that generates a low-voltage pulse for erasing any images displayed on the display surface 11D of the display board section 11. The device control circuit 40 controls a timing at which the images displayed on the display surface 11D are erased by the low-voltage pulse supplied from the erasure circuit.

The handwriting input device 1 according to the first embodiment includes an operation button 21, as illustrated in FIGS. 1 and 3A. In the handwriting input device 1 according to the first embodiment, the operation button 21 constitutes means for a predetermined operation that visually erases any images displayed on the display surface 11D of the display board section 11 all at once.

In the first embodiment, the operation button 21 also functions as a power supply button of the handwriting input device 1. Each time the operation button 21 is pressed, the handwriting input device 1 is alternately powered on and off.

In the handwriting input device 1 according to the first embodiment, the operation button 21 also functions as a transfer button that generates a trigger that transmits (transfers) the electronic data stored in the memory to the mobile terminal 3.

As illustrated in FIGS. 1 and 3A, the operation button 21 is disposed outside the display area of the display board section 11. In this example, the operation button 21 is disposed on a panel 20, which is located in an upper portion of the display board section 11.

In the first embodiment, a power indicator 22, a communication indicator 23, and a memory indicator 24 are disposed on the panel 20. The power indicator 22 notifies the user that the power is on or off. The communication indicator 23 notifies the user of the status of communication with the mobile terminal 3. The memory indicator 24 notifies the user whether or not there is electronic data still stored and retained in the memory at the power-off state. In this example, these indicators 22, 23, and 24 include light-emitting diodes (LEDs), which are examples of semiconductor light-emitting elements that each indicate the corresponding status by emitting light. Moreover, in this example, a beep speaker 25 is disposed on the panel 20. The beep speaker 25 is an example of a sound emitting section that notifies the user of the communication status and the storage and retention status of the memory by sound.

The operation button 21, the indicators 22, 23, and 24, and the beep speaker 25, which are disposed on the panel 20, are connected to the device control circuit 40 through a connection connector 15 (FIG. 3C).

The mobile terminal 3 functions to receive electronic data transmitted from the handwriting input device 1 and transfer the electronic data to the PC 4. In the first embodiment, before transferring the electronic data to the PC 4, the mobile terminal 3 performs a predetermined process on the electronic data received from the handwriting input device 1. For example, the mobile terminal 3 assigns a page number to the electronic data according to delimiter information. The mobile terminal 3 and the PC 4 are connected through a communication network 5. The communication network 5 can include public networks including the Internet and mobile phone networks. Further, the communication network 5 may also include a wireless local area network (LAN) using Wi-Fi (registered trademark). The communication network 5 may also include a LAN that connects the PC 4 and the mobile terminal 3 by a wire connection.

Alternatively, the handwriting input device 1 may directly transmit the electronic data to the PC 4. In this case, the processing functions of the mobile terminal 3 need only be implemented by either the handwriting input device 1 or the PC 4.

Example of Electrical Configuration of Handwriting Input Device

Figure 4:
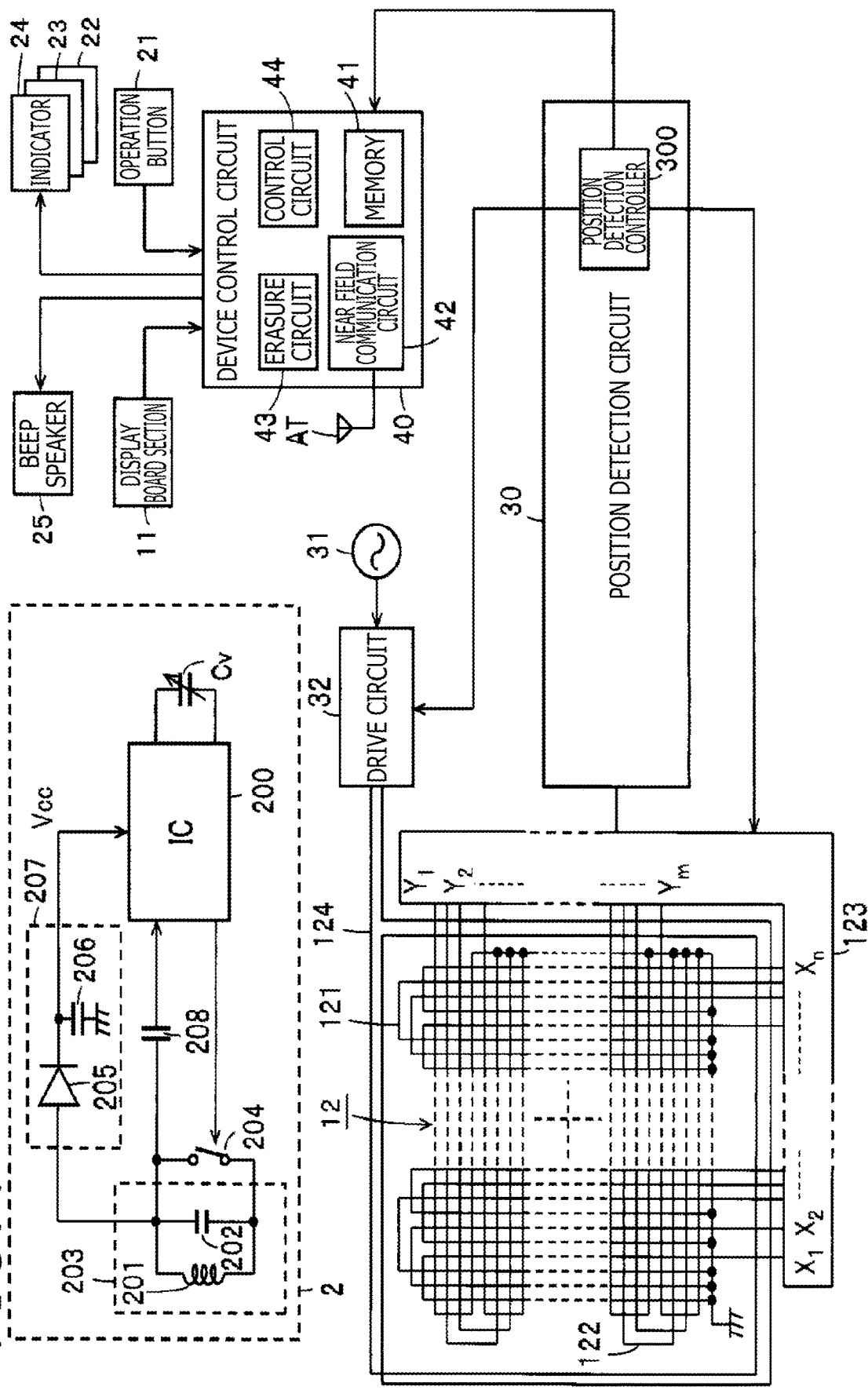
FIG. 4 is a diagram for describing an example of an electrical configuration of the handwriting input device according to the first embodiment of the present disclosure.

FIG. 4 is a diagram illustrating an equivalent circuit of the electronic pen 2 according to the first embodiment and an example of a configuration of the electronic circuitry of the handwriting input device 1 that performs position detection and pen-pressure detection through the electromagnetic induction with the electronic pen 2. The handwriting input device 1 according to the first embodiment includes a battery (not illustrated in FIG. 4) as a power source. As described above, each time the operation button 21 is pressed, the handwriting input device 1 is alternately turned on and off.

In the example illustrated in FIG. 4, as described above, the handwriting input device 1 includes the display board section 11, the position detection sensor 12, the operation button 21, the indicators 22, 23, and 24, the beep speaker 25, the position detection circuit 30, which is connected to the position detection sensor 12, and the device control circuit 40.

The position detection sensor 12 includes an X-axis direction loop coil group 121 and a Y-axis direction loop coil group 122, which are stacked one on the other, and a selection circuit 123, which sequentially selects the loop coils of one of the two loop coil groups 121 and 122.

The electronic pen 2 includes a signal control circuit including an integrated circuit (IC) 200 and obtains a drive voltage for driving the IC 200 from an excitation signal transmitted from an excitation coil 124, which is disposed in the position detection sensor 12 of the handwriting input device 1. Although, in FIG. 4, the loop coil groups 121 and 122 of the position detection sensor 12 are described as being only used to receive electromagnetic coupling signals from the electronic pen 2 as an example, the loop coil groups 121 and 122 of the position detection sensor 12 can, instead of the excitation coil 124, drive the signal control circuit included in the electronic pen 2 by electromagnetic coupling with the electronic pen 2. Further, the position detection sensor 12 transmits signals such as predetermined control data to the signal control circuit included in the electronic pen 2.

In the position detection sensor 12 according to the example illustrated in FIG. 4, the excitation coil 124 is disposed so as to surround the X-axis direction loop coil group 121 and the Y-axis direction loop coil group 122. Although the excitation coil 124 has two turns in the example illustrated in FIG. 4, the excitation coil 124 has more turns such as 8 to 10 turns in actual implementation. As illustrated in FIG. 4, the excitation coil 124 is connected to a drive circuit 32. The drive circuit 32 is connected to an oscillation circuit 31, which oscillates at a predetermined frequency fo.

The drive circuit 32 is controlled by a position detection controller 300, which is included in the position detection circuit 30. The position detection controller 300 includes, for example, a microprocessor. The position detection controller 300 controls the drive circuit 32 so as to control the supply of an oscillation signal of the frequency fo from the oscillation circuit 31 to the excitation coil 124, thereby controlling signal transmission from the excitation coil 124 to the electronic pen 2.

The selection circuit 123 selects one loop coil under selection control of the position detection controller 300. An induced voltage generated in the loop coil selected by the selection circuit 123 is supplied to the position detection circuit 30. The position detection circuit 30 performs a process of detecting the coordinates (X and Y coordinates) of the position indicated by the electronic pen 2 under the control of the position detection controller 300, and the position detection controller 300 generates coordinate data of the position indicated by the electronic pen 2.

Apart from the detection of the position indicated by the electronic pen 2, the position detection controller 300 also detects a pen pressure by detecting intermitting signals from the electronic pen 2 as a digital signal of several bits. Then, the position detection controller 300 generates electronic data by associating the information regarding the detected position indicated by the electronic pen 2 with the information regarding the detected pen pressure, and supplies the electronic data to the device control circuit 40.

The device control circuit 40 includes a memory 41, a near field communication circuit 42, an erasure circuit 43, and a control circuit 44. The memory 41 stores and retains the electronic data supplied from the position detection circuit 30 therein. The near field communication circuit 42 performs wireless communication with the mobile terminal 3. The erasure circuit 43 generates a low-voltage pulse that erases any images displayed on the display surface 11D of the display board section 11. The control circuit 44 includes, for example, a microprocessor. As described above, the operation button 21, the indicators 22, 23, and 24, and the beep speaker 25 are connected to the device control circuit 40.

A power supply voltage is supplied from the battery to the control circuit 44 of the device control circuit 40 at all times. In the power-off state, however, the control circuit 44 is in the standby state, saving power. The memory 41 is configured as a non-volatile memory that keeps the stored electronic data retained therein unless the electronic data is erased. The memory 41 may be configured as a volatile memory supported by backup power from the battery at all times.

The control circuit 44 of the device control circuit 40 monitors the pressing operation on the operation button 21. In response to the pressing operation, the control circuit 44 of the device control circuit 40 performs the power on/off control or the erasure control for erasing any images displayed on the display surface 11D of the display board section 11 as well as a process of transmitting and erasing the electronic data stored in the memory 41. In this case, the control circuit 44 also monitors the status of communication with the mobile terminal 3 through the near field communication circuit 42 and the storage status of the electronic data in the memory 41 at the time when the operation button 21 is pressed, and performs different processes according to the monitoring result.

The control circuit 44 controls the light-emitting mode of the power indicator 22 according to the result of monitoring the pressing operation on the operation button 21. Meanwhile, the control circuit 44 also controls the light-emitting mode of the communication indicator 23 according to the result of monitoring the status of communication with the mobile terminal 3 through the near field communication circuit 42. Further, the control circuit 44 also controls the light-emitting mode of the memory indicator 24 according to the status of communication with the mobile terminal 3 through the near field communication circuit 42 and the storage status of the electronic data in the memory 41. Further, the control circuit 44 controls not only the light-emitting mode of each of the indicators 22 to 24 but also the emission of a beep sound from the beep speaker 25 at a necessary timing.

A circuitry configuration of the electronic pen 2 is enclosed with dotted lines in FIG. 4. A resonant circuit 203 is configured with a capacitor 202, which is connected in parallel to a coil 201 serving as an inductance element. The resonant circuit 203 is connected in parallel to a switch 204. The switch 204 is turned on and off under the control of the IC 200. When the switch 204 is turned off, the resonant circuit 203 resonates with the signal from the position detection sensor 12. When the switch 204 is turned on, the capacitor 202, which is connected in parallel to the coil 201, is short-circuited, so that the resonant circuit 203 stops resonating with the signal from the position detection sensor 12.

The IC 200 operates at a power supply voltage Vcc supplied from a rectifier circuit (power supply circuit) 207, which includes a diode 205 and a capacitor 206. The rectifier circuit 207 produces the power supply voltage Vcc by rectifying an alternating-current (AC) signal received by the resonant circuit 203 from the position detection sensor 12 of the handwriting input device 1 through electromagnetic induction. The IC 200, which is connected to the resonant circuit 203 via a capacitor 208, monitors the operation state of the resonant circuit 203. By monitoring the operation state of the resonant circuit 203, the IC 200 detects either the state of electromagnetic coupling with the excitation coil 124 of the position detection sensor 12 or signals such as control data transmitted from the position detection sensor 12 using the two loop coil groups 121 and 122, not described in this example here, so as to perform desired operation controls.

The electronic pen 2 according to the first embodiment includes a pen-pressure detection circuit including a pressure-sensitive element that detects the pen pressure applied to the pen tip of the electronic pen 2 as a capacitance Cv of a variable capacitor, for example. The IC 200 is connected to this variable capacitor, as illustrated in FIG. 4, and detects the capacitance Cv corresponding to the pen pressure. The IC 200 detects the pen pressure of the electronic pen 2 from the value of the capacitance Cv. The IC 200 then converts the detected pen pressure into an 8-bit digital signal, for example, and controls the switch 204 according to the digital signal corresponding to the pen pressure, thereby transmitting the pen-pressure information to the position detection sensor 12 of the handwriting input device 1 as additional information.

A position detection operation and a pen-pressure information detection operation of the electronic pen 2 and the position detection circuit 30 of the handwriting input device 1 configured as described above will be described below.

First, the position detection controller 300 drives the drive circuit 32 to transmit a signal from the excitation coil 124 to the electronic pen 2 for a predetermined period of time. Next, the position detection controller 300 causes the selection circuit 123 to sequentially select one of the loop coils of the X-axis direction loop coil group 121 to transmit a burst signal to the electronic pen 2. The resonant circuit 203 of the electronic pen 2 receives the burst signal and returns the received burst signal to the position detection sensor 12 of the handwriting input device 1. The position detection controller 300 detects the returned burst signal as a position detection signal, thereby obtaining an X coordinate value of the position indicated by the electronic pen 2. Next, the position detection controller 300 performs a similar process for the Y-axis direction loop coil group 122 to obtain a Y coordinate value of the position indicated by the electronic pen 2.

After the position detection controller 300 of the position detection circuit 30 detects the position indicated by the electronic pen 2, the position detection controller 300 continuously transmits a signal from the excitation coil 124 for a predetermined period of time or longer to detect the pen-pressure information transmitted from the electronic pen 2 as additional information. After that, the position detection controller 300 continuously performs transmission and reception, the number of times corresponding to the number of bits of the digital signal carrying the additional information, at similar timings to when detecting the coordinates.

The IC 200 of the electronic pen 2 controls on and off of the switch 204 in synchronization with the transmission and reception of the signal to and from the position detection sensor 12 of the handwriting input device 1 according to the digital signal carrying the additional information including the pen-pressure information that corresponds to the capacitance Cv of the variable capacitor, which constitutes a pen-pressure detection section. When the switch 204 is turned off, the resonant circuit 203 can return the signal transmitted from the position detection sensor 12 to the position detection sensor 12. Therefore, the loop coils of the position detection sensor 12 receive this signal. When the switch 204 is turned on, the resonant circuit 203 is prohibited from resonating. Since no signal is returned from the resonant circuit 203 to the position detection sensor 12, no signal is received by the loop coils of the position detection sensor 12.

The position detection controller 300 of the position detection circuit 30 determines the presence or absence of the received signal the number of times corresponding to the number of bits of the digital signal carrying the additional information, thereby receiving the digital signal of multiple bits corresponding to the pen-pressure information and detecting the pen-pressure information from the electronic pen 2. Therefore, the electronic pen 2 transmits the pen-pressure information as an amplitude shift keying (ASK) modulated signal to the position detection sensor 12 of the handwriting input device 1.

Example of Processing Operation of Handwriting Input Device

Overview of Operation

An overview of the operation of the above-described handwritten information management system will be described below. In the handwriting input device 1 according to the first embodiment, when the operation button 21 is pressed while the power is off, the electronic circuitry is supplied with power, and the power indicator 22 notifies the user of the power-on.

In the handwriting input device 1, when a handwritten input is made on the display surface 11D by the electronic pen 2 in the power-on state, an image corresponding to the handwritten input is formed and displayed on the display surface 11D of the display board section 11. At the same time, the position of the pen tip of the electronic pen 2 is detected by the position detection sensor 12, and electronic data, which corresponds to the image displayed on the display surface 11D and includes time-series data of the detected position information, is stored and retained in the memory 41.

When the user determines that the handwritten input has been completed, the user presses the operation button 21 of the handwriting input device 1 again. In response, the handwriting input device 1 determines whether or not, in this example, the mobile terminal 3 and the handwriting input device 1 can perform near field communication. In this example, since near field communication in accordance with the Bluetooth (registered trademark) standard is employed as described above, the handwriting input device 1 determines whether or not near field communication with the mobile terminal 3 is possible according to whether or not communication pairing has been established between the handwriting input device 1 and the mobile terminal 3.

When the handwriting input device 1 determines (confirms) that communication with the mobile terminal 3 is possible, the handwriting input device 1 adds delimiter information, such as page break information, to the electronic data stored in the memory 41 and then transmits the electronic data to the mobile terminal 3. At this time, the handwriting input device 1 switches on the communication indicator 23 to notify the user that near field communication is possible.

When the transmission of the electronic data stored and retained in the memory 41 is completed, the handwriting input device 1 switches off the communication indicator 23 and erases the electronic data stored and retained in the memory 41. In the first embodiment, after erasing the electronic data stored and retained in the memory 41, the handwriting input device 1 supplies a low-voltage pulse from the erasure circuit 43 to the display board section 11 to visually erase any images, which have been formed and displayed on the display surface 11D, from the entire display surface 11D all at once. After that, in the first embodiment, the handwriting input device 1 is turned off.

In the first embodiment, when the handwriting input device 1 determines that communication with the mobile terminal 3 is not possible (when the handwriting input device 1 cannot confirm that communication with the mobile terminal 3 is possible), the handwriting input device 1 keeps the electronic data, to which the delimiter information is added, retained in the memory 41 without erasing the electronic data from the memory 41. Then, in the first embodiment, the handwriting input device 1 blinks the communication indicator 23 to notify the user that near field communication with the mobile terminal 3 is not possible. At the same time, the handwriting input device 1 blinks the memory indicator 24 to notify the user that the electronic data is stored and retained in the memory 41 without being transmitted.

After that, the handwriting input device 1 supplies a low-voltage pulse from the erasure circuit 43 to the display board section 11 to visually erase any images, which have been formed and displayed on the display surface 11D, from the entire display surface 11D all at once. Subsequently, the power is turned off to stop supplying power to the position detection sensor 12, the position detection circuit 30, and the device control circuit 40. Even after the power is turned off, the control circuit 44 may maintain the display control to keep the communication indicator 23 and the memory indicator 24 blinking.

With the electronic data retained in the memory 41, when new electronic data corresponding to a new handwritten input is additionally stored in the memory 41 and then the operation button 21 is pressed, or when the operation button 21 is pressed before new electronic data is stored in the memory 41, if the handwriting input device 1 can communicate with the mobile terminal 3, the handwriting input device 1 transmits the existing electronic data that has been retained in the memory 41 to the mobile terminal 3 together with the new electronic data, if any. After the completion of the transmission, the existing electronic data (and, if any, the new electronic data) is/are erased from the memory 41.

In the handwriting input device 1 according to the first embodiment, in response to the user pressing the operation button 21, new delimiter information is added also to new electronic data corresponding to a new handwritten input image(s). Therefore, the new electronic data can be distinguished from existing electronic data that has not been transmitted and that is retained in the memory 41.

With electronic data still retained in the memory 41, when the operation button 21 is pressed, if communication is not possible and the memory 41 has sufficient remaining capacity, new electronic data to which delimiter information is added is further retained in the memory 41. At this time, as described above, the handwriting input device 1 blinks the communication indicator 23 and the memory indicator 24 to notify the user that the electronic data is still retained in the memory 41 without being transferred to the mobile terminal 3.

If there is any existing electronic data retained in the memory 41 when the operation button 21 is pressed and the power is turned on, the handwriting input device 1 according to the first embodiment blinks the memory indicator 24 to notify the user of this state. Then, before new electronic data is stored, the handwriting input device 1 may receive a different operation of the operation button 21 such as the long pressing of the operation button 21 as compared to the normal operation of the operation button 21, to thereby check the communication status and transmit the existing electronic data retained in the memory 41 to the mobile terminal 3. Here, the operation of pressing the operation button 21 for a short period of time equal to or less than a first duration of time is set as the predetermined operation, and the operation of pressing the operation button 21 for a second duration of time longer than the first duration of time is set as the long-pressing operation. When the operation button 21 is long pressed, the handwriting input device 1 does not erase the image(s) displayed on the display board section 11 since it is unnecessary, and keeps the power on.

When the operation button 21 is pressed but communication is not possible, the handwriting input device 1 according to the first embodiment determines whether or not the remaining capacity of the memory 41 is insufficient, and thus it is difficult to store new electronic data. When the determination result is affirmative, the handwriting input device 1 does not erase the image(s) displayed on the display surface 11D of the display board section 11 and keeps the power of the handwriting input device 1 on. Further, the handwriting input device 1 uses the memory indicator 24 and the beep speaker 25 to notify the user of this state.

When the user is notified of this state, the user creates an environment where communication between the handwriting input device 1 and the mobile terminal 3 is possible. Then, the handwriting input device 1 uses the communication indicator 23 to notify the user that communication is now possible. In response, in this example, the user long presses the operation button 21, causing the handwriting input device 1 to transmit the electronic data stored and retained in the memory 41 to the mobile terminal 3.

In this case, as another possible configuration of the handwriting input device 1, even when the operation button 21 is long pressed, the handwriting input device 1 may be turned off without keeping the power on, and the image(s) displayed on the display surface 11D may remain without being erased. In this case, the memory indicator 24 notifies the user that the electronic data is retained in the memory 41. When the user presses the operation button 21 in a normal way next time, upon turning on the handwriting input device 1, the user recognizes that the electronic data stored in the memory 41 needs to be transmitted to the mobile terminal 3 according to the indication of the memory indicator 24 as well as the fact that the image(s) remain(s) displayed on the display surface 11D. Therefore, the user creates an environment where communication is possible and long presses the operation button 21. In response, the electronic data stored in the memory 41 is transmitted to the mobile terminal 3, and the displayed image(s) is/are erased.

Flow of Operation of Handwriting Input Device 1 According to First Embodiment

Next, an example of a flow of a processing operation of the handwriting input device 1 according to the first embodiment will be described with reference to flowcharts illustrated in FIGS. 5 to 8. It is assumed that a process at each step in FIGS. 5 to 8 is performed by the control circuit 44 of the device control circuit 40 according to a software program.

In the example illustrated in the flowcharts of FIGS. 5 to 8, the handwriting input device 1 is assumed to be in the off state at the beginning of the flow.

Figure 5:
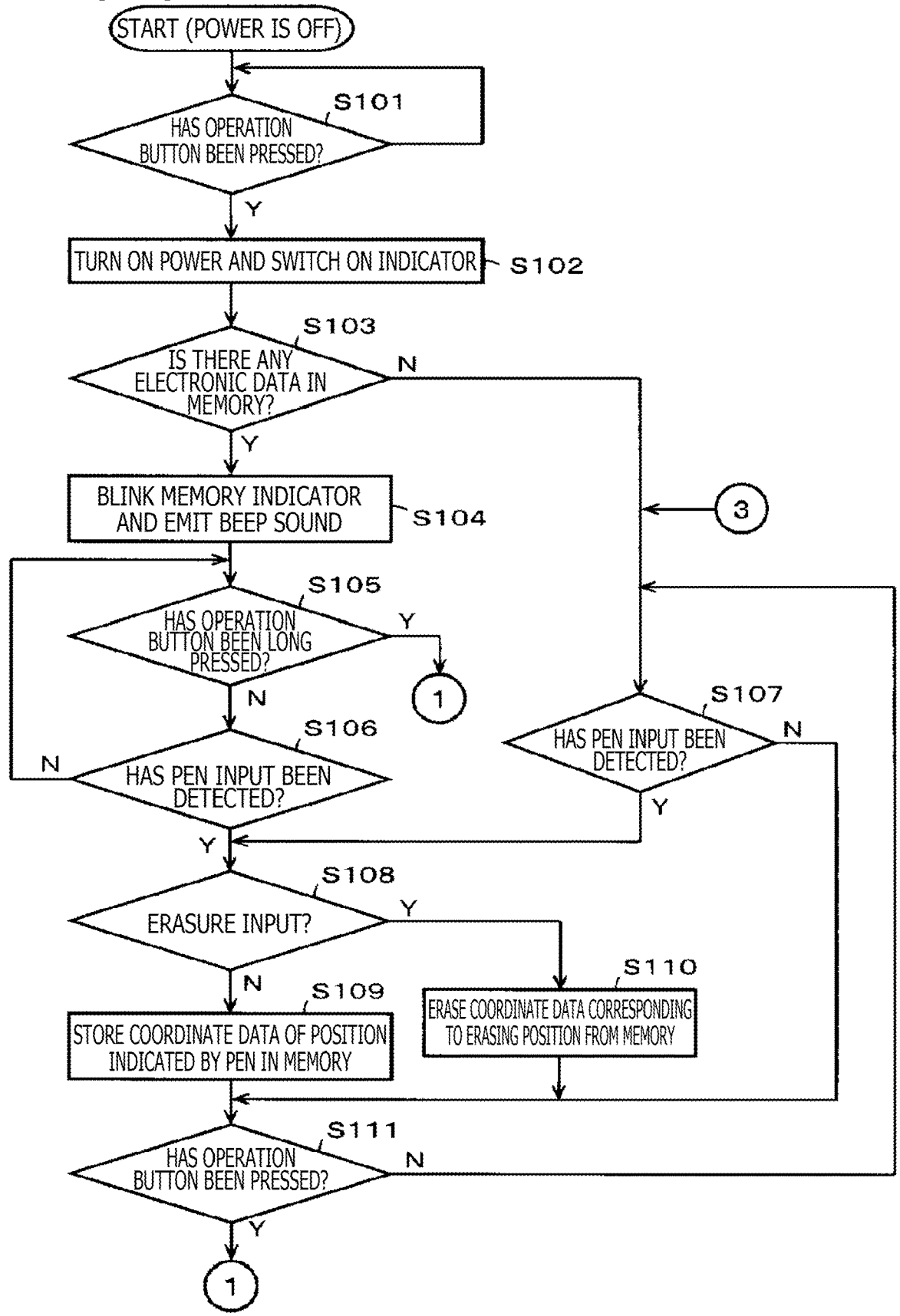
FIG. 5 is a diagram illustrating a portion of a flowchart for describing a flow of the operation of the handwriting input device according to the first embodiment of the present disclosure.

As illustrated in FIG. 5, the control circuit 44 first determines whether or not the operation button 21 has been pressed (step S101). When the control circuit 44 determines at step S101 that the operation button 21 has not been pressed, the control circuit 44 waits for the operation button 21 to be pressed. When the control circuit 44 determines at step S101 that the operation button 21 has been pressed, the control circuit 44 turns on the handwriting input device 1 and switches on the power indicator 22 (step S102).

Next, the control circuit 44 determines whether or not there is any electronic data stored and retained in the memory 41 (step S103). When the control circuit 44 determines that there is electronic data stored and retained in the memory 41, the control circuit 44 blinks the memory indicator 24 and, at the same time, emits a beep sound from the beep speaker 25 (step S104).

Next, the control circuit 44 determines whether or not the operation button 21 has been long pressed (step S105). When the control circuit 44 determines that the operation button 21 has not been long pressed, the control circuit 44 determines whether or not an indication input by the electronic pen 2 on the display surface 11D has been detected (step S106). When the control circuit 44 determines at step S106 that no indication input has been detected, the control circuit 44 returns to step S105.

Figure 6:
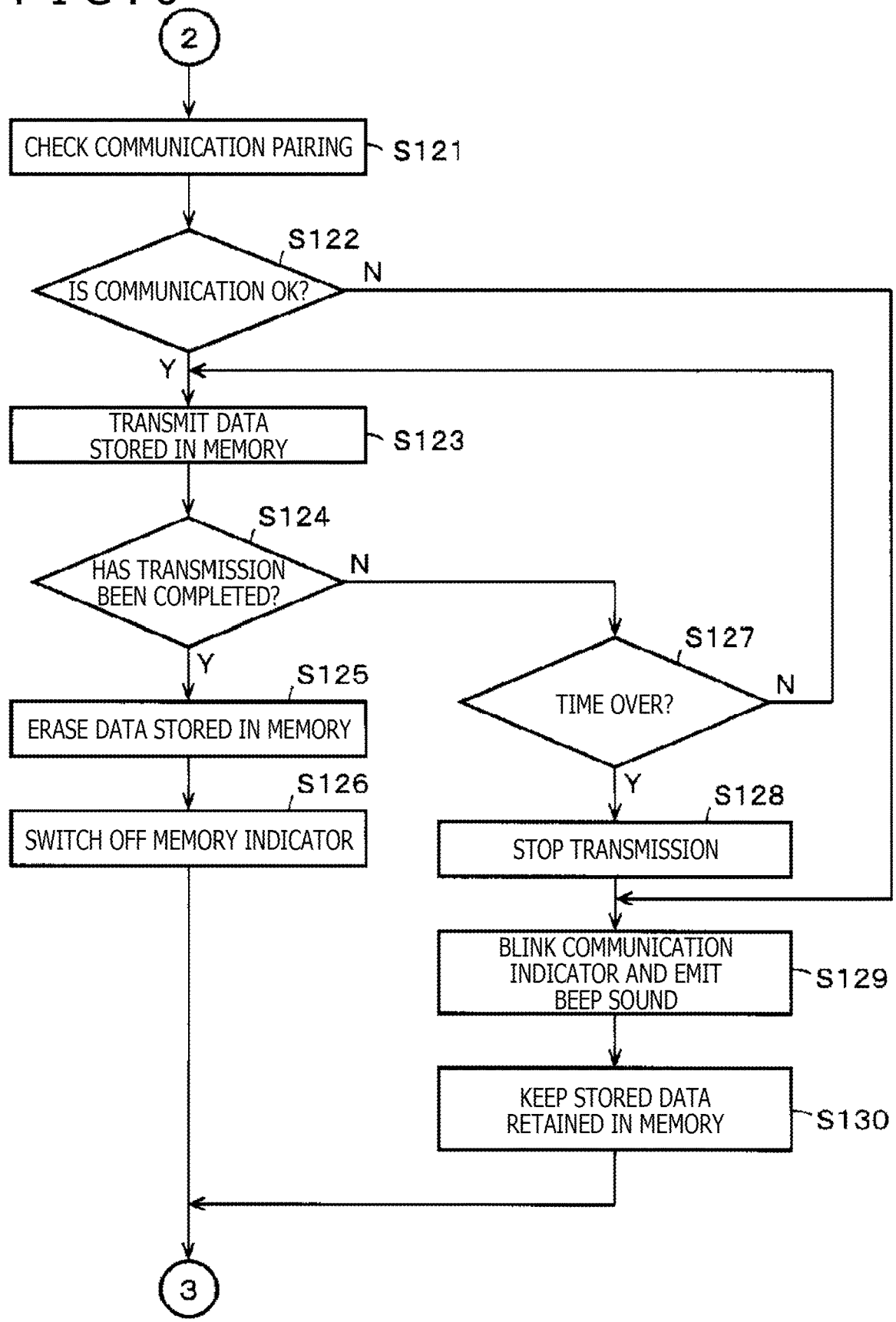
FIG. 6 is a diagram illustrating a portion of the flowchart for describing the flow of the operation of the handwriting input device according to the first embodiment of the present disclosure.

When the control circuit 44 determines at step S105 that the operation button 21 has been long pressed, the control circuit 44 checks whether or not wireless communication with the mobile terminal 3 is possible by checking if communication pairing between the near field communication circuit 42 and the mobile terminal 3 has been established (step S121 of FIG. 6). Subsequently, the control circuit 44 determines whether or not wireless communication with the mobile terminal 3 is possible (step S122).

Then, when the control circuit 44 determines at step S122 that wireless communication with the mobile terminal 3 is possible, the control circuit 44 transmits the electronic data stored in the memory 41 to the mobile terminal 3 (step S123). Then, the control circuit 44 determines whether or not the transmission has been completed (step S124). When the control circuit 44 determines that the transmission has been completed, the control circuit 44 erases the electronic data stored in the memory 41 (step S125). The control circuit 44 then turns off the blinking memory indicator 24 (step S126).

When the control circuit 44 determines at step S124 that the transmission of the electronic data has not been completed, the control circuit 44 determines whether or not a predetermined period of time or more has elapsed since the start of transmission (step S127). When the control circuit 44 determines that the predetermined period of time or more has not elapsed since the start of the transmission, the control circuit 44 returns to step S123 and continues transmitting the electronic data stored in the memory 41.

When the control circuit 44 determines at step S127 that the predetermined period of time or more has elapsed since the start of the transmission, the control circuit 44 determines that the transmission of the electronic data has failed, and stops the transmission (step S128). Then, the control circuit 44 blinks the communication indicator 23 and, at the same time, emits a beep sound from the beep speaker 25 (step S129).

Also when the control circuit 44 determines at step S122 that wireless communication with the mobile terminal 3 is not possible, the control circuit 44 determines that wireless communication with the mobile terminal 3 is not possible and proceeds to step S129. At step S129, the control circuit 44 blinks the communication indicator 23 and, at the same time, emits a beep sound from the beep speaker 25. Then, the control circuit 44 keeps the electronic data, which is already stored in the memory 41, retained in the memory 41 (step S130).

After step S126 or step S130, the control circuit 44 proceeds to step S107 of FIG. 5 and determines whether or not an indication input by the electronic pen 2 on the display surface 11D has been detected. When the control circuit 44 determines at step S103 of FIG. 5 that no electronic data is stored or retained in the memory 41, the control circuit 44 proceeds to step S107 and determines whether or not an indication input by the electronic pen 2 on the display surface 11D has been detected.

When the control circuit 44 detects an indication input by the electronic pen 2 on the display surface 11D at step S106 of FIG. 5 or when the control circuit 44 detects an indication input by the electronic pen 2 on the display surface 11D at step S107 of FIG. 5, the control circuit 44 determines whether or not the indication input by the electronic pen 2 is an erasure input such as a double line superimposed on a previous input portion (step S108).

When the control circuit 44 determines at step S108 that the indication input by the electronic pen 2 is not an erasure input, the control circuit 44 detects coordinate data of the position where the indication input is made by the electronic pen 2, and stores and retains electronic data including the coordinate data and pen-pressure data in the memory 41 (step S109). When the control circuit 44 determines at step S108 that the indication input by the electronic pen 2 is an erasure input, the control circuit 44 erases, from the memory 41, electronic data corresponding to a previous indication input on which the erasure input such as a double line is superimposed (step S110).

After step S109 or step S110, the control circuit 44 determines whether or not the operation button 21 has been pressed (step S111). Also when the control circuit 44 determines at step S107 that an indication input by the electronic pen 2 on the display surface 11D has not been detected, the control circuit 44 proceeds to step S111 and determines whether or not the operation button 21 has been pressed. When the control circuit 44 determines at step S111 that the operation button 21 has not been pressed, the control circuit 44 returns to step S107 and repeats processes at and after step S107.

Figure 7:
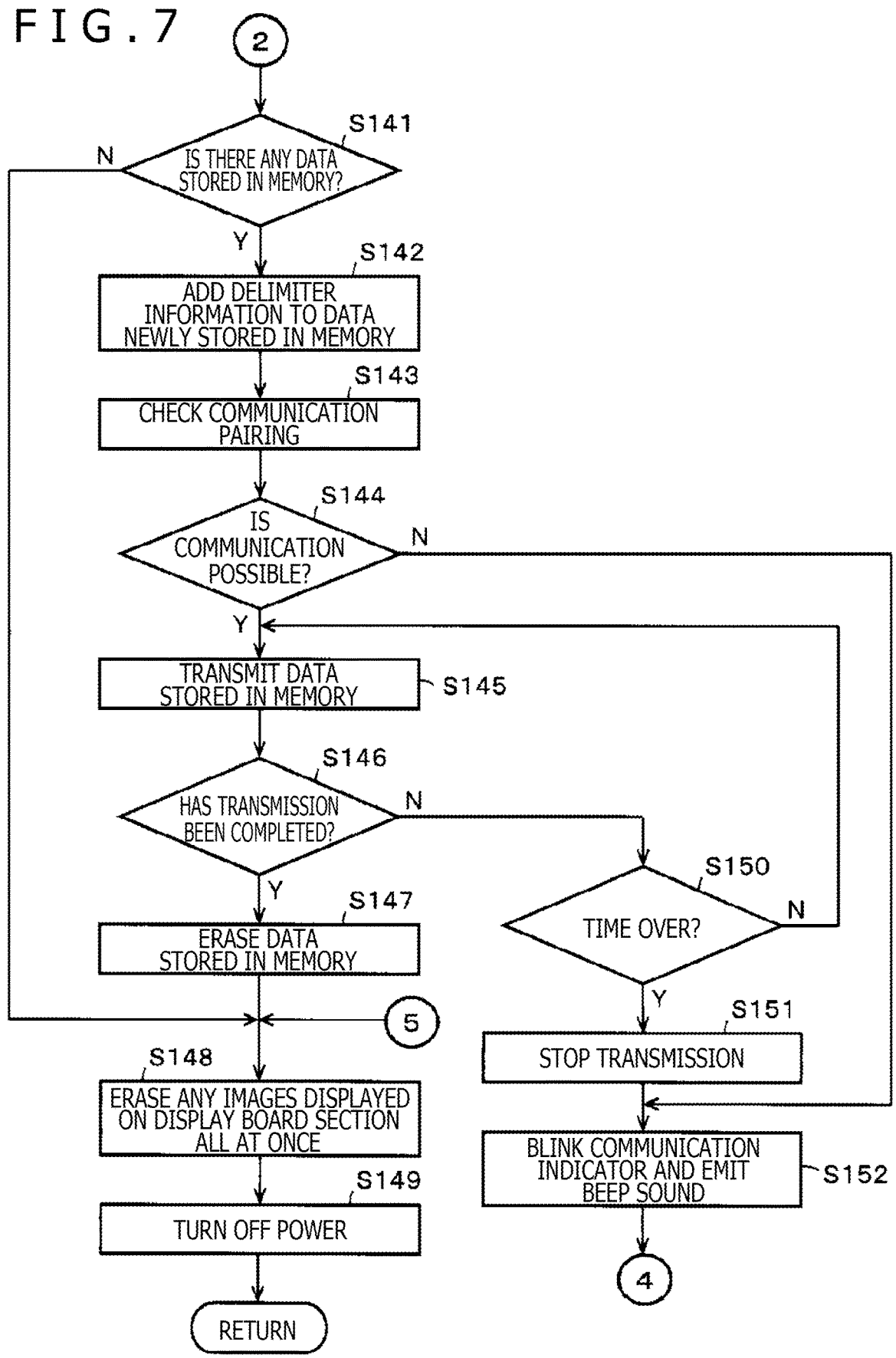
FIG. 7 is a diagram illustrating a portion of the flowchart for describing the flow of the operation of the handwriting input device according to the first embodiment of the present disclosure.
Figure 8:
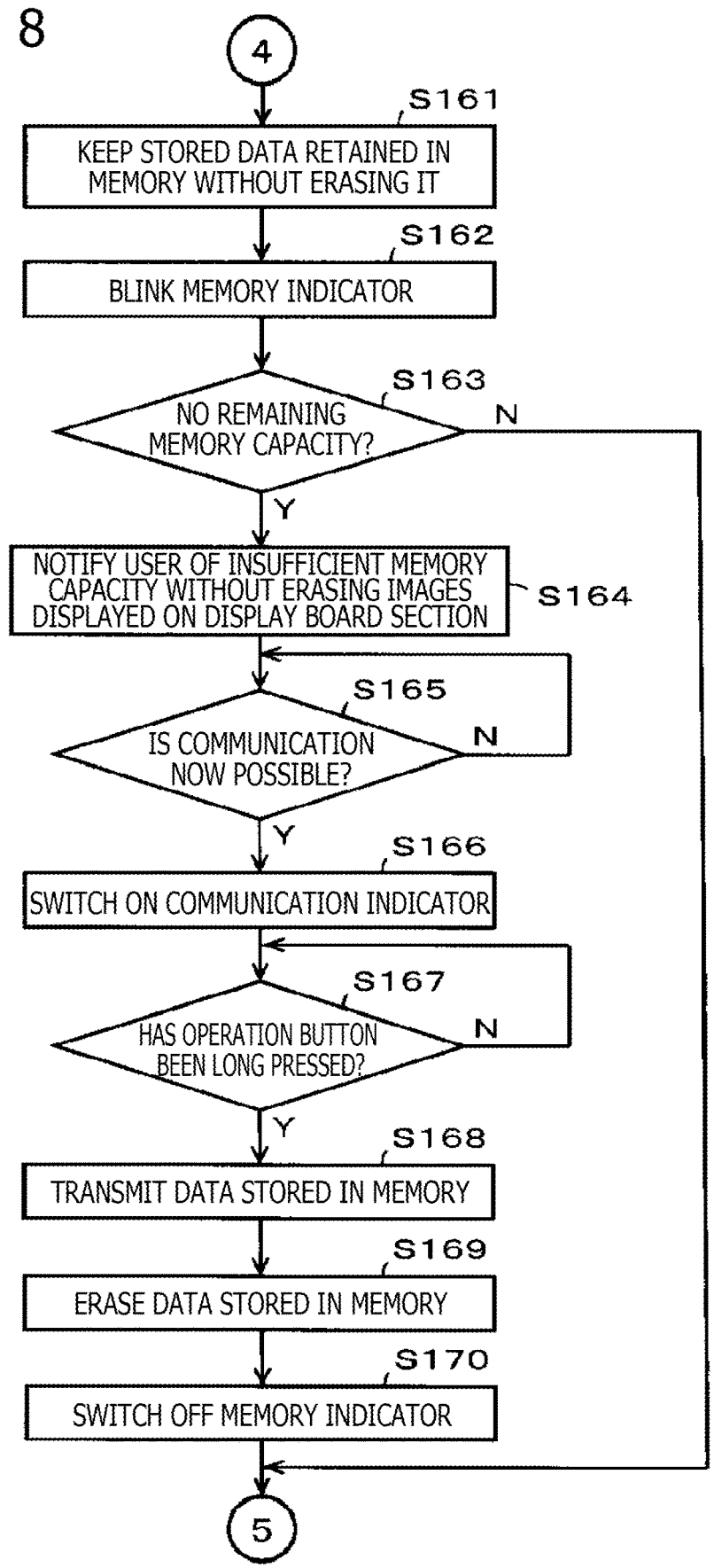
FIG. 8 is a diagram illustrating a portion of the flowchart for describing the flow of the operation of the handwriting input device according to the first embodiment of the present disclosure.

When the control circuit 44 determines at step S111 that the operation button 21 has been pressed, the control circuit 44 determines whether or not there is any electronic data stored and retained in the memory 41 (step S141 of FIG. 7). When the control circuit 44 determines at step S141 that no electronic data is stored or retained in the memory 41, the control circuit 44 proceeds to step S148. At step S148, the control circuit 44 supplies a low-voltage pulse from the erasure circuit 43 to the display board section 11 to erase any images displayed on the display surface 11D all at once. After that, the control circuit 44 turns off the handwriting input device 1 (step S149).

Below is the reason that the control circuit 44 erases any images displayed on the display surface 11D of the display board section 11 even when there is no electronic data stored in the memory 41 at step S141. When an erasure input is made by an indication input by the electronic pen 2, the control circuit 44 erases the electronic data corresponding to the position indicated by the erasure input from the memory 41. However, even though there is no electronic data stored in the memory 41, there are cases where the image indicated to be erased by the erasure input remains displayed on the display surface 11D of the display board section 11.

Next, when the control circuit 44 determines at step S141 that there is electronic data stored and retained in the memory 41, the control circuit 44 adds delimiter information such as a page break mark to the electronic data newly stored and retained after the operation button 21 is pressed and the power is on (step S142).

Next, the control circuit 44 checks whether wireless communication with the mobile terminal 3 is possible by checking whether or not communication pairing between the near field communication circuit 42 and the mobile terminal 3 has been established (step S143). Then, the control circuit 44 determines whether or not wireless communication with the mobile terminal 3 is possible (step S144).

When the control circuit 44 determines at step S144 that wireless communication with the mobile terminal 3 is possible, the control circuit 44 transmits the electronic data stored in the memory 41 to the mobile terminal 3 (step S145). Then, the control circuit 44 determines whether or not the transmission has been completed (step S146). When the control circuit 44 determines that the transmission has been completed, the control circuit 44 erases the electronic data stored in the memory 41 (step S147).

Next, the control circuit 44 proceeds to step S148. At step S148, the control circuit 44 supplies a low-voltage pulse from the erasure circuit 43 to the display board section 11 to erase, all at once, any images displayed on the display surface 11D. After that, the control circuit 44 turns off the handwriting input device 1 (step S149).

When the control circuit 44 determines at step S146 that the transmission of the electronic data has not been completed, the control circuit 44 determines whether or not a predetermined period of time or more has elapsed since the start of the transmission (step S150). When the control circuit 44 determines that the predetermined period of time or more has not elapsed since the start of the transmission, the control circuit 44 returns to step S145 and continues transmitting the electronic data stored in the memory 41.

When the control circuit 44 determines at step S150 that the predetermined period of time or more has elapsed since the start of the transmission, the control circuit 44 determines that the transmission of the electronic data has failed, and stops the transmission (step S151). Then, the control circuit 44 blinks the communication indicator 23 and, at the same time, emits a beep sound from the beep speaker 25 (step S152). Then, the control circuit 44 keeps the electronic data, which is already stored in the memory 41, retained in the memory 41 (step S161 of FIG. 8) and blinks the memory indicator 24 (step S162).

Next, the control circuit 44 determines whether or not the memory 41 has no remaining capacity by checking if the remaining capacity of the memory 41 is equal to or less than a predetermined remaining capacity value (step S163). Here, the predetermined remaining capacity value is a value at which adding new electronic data may cause the memory 41 to run out of the capacity, and is set to a value that can leave some capacity in the memory 41.

When the control circuit 44 determines at step S163 that the remaining capacity of the memory 41 is not equal to or less than the predetermined remaining capacity value, the control circuit 44 proceeds to step S148 of FIG. 7. At step S148, the control circuit 44 supplies a low-voltage pulse from the erasure circuit 43 to the display board section 11 to erase, all at once, any images displayed on the display surface 11D. After that, the control circuit 44 turns off the handwriting input device 1 (step S149).

When the control circuit 44 determines at step S163 that the remaining capacity of the memory 41 is equal to or less than the predetermined remaining capacity value, the control circuit 44 does not erase the image(s) displayed on the display surface 11D of the display board section 11. Instead, in order to notify the user that the remaining capacity of the memory 41 is insufficient, the control circuit 44, for example, blinks the memory indicator 24 with a blinking cycle faster than the blinking cycle indicating that the electronic data is stored and retained in the memory 41 and, at the same time, emits a beep sound from the beep speaker 25 in a mode that is distinguishable from the other cases (step S164). This encourages the user to transfer the electronic data in the memory 41 to the mobile terminal 3 because the remaining capacity of the memory 41 is insufficient. In response, the user can move the handwriting input device 1 to an environment where communication with the mobile terminal 3 is possible.

The control circuit 44 determines whether or not the handwriting input device 1 is now in an environment where communication with the mobile terminal 3 is possible (step S165) and waits for the handwriting input device 1 to be in such an environment where communication with the mobile terminal 3 is possible. Then, when the control circuit 44 determines at step S165 that the handwriting input device 1 is in an environment where communication with the mobile terminal 3 is possible, the control circuit 44 switches on the communication indicator 23 to notify the user that communication with the mobile terminal 3 is possible (step S166).

Next, the control circuit 44 monitors the user's long-pressing operation of the operation button 21 (step S167). When the control circuit 44 determines that the operation button 21 has been long pressed by the user, the control circuit 44 transmits all the electronic data stored and retained in the memory 41 to the mobile terminal 3 (step S168). The electronic data stored and retained in the memory 41 here is data corresponding to multiple pages separated by delimiter information. In other words, the electronic data stored and retained in the memory 41 is data corresponding to multiple pages, but since the electronic data is separated by the delimiter information, the mobile terminal 3 or the PC 4 can assign different page numbers to individual pages in a distinguishable manner.

After the control circuit 44 transmits the electronic data stored and retained in the memory 41 to the mobile terminal 3 at step S168, the control circuit 44 erases the electronic data stored and retained in the memory 41 from the memory 41 (step S169). Then, the control circuit 44 switches off the memory indicator 24 (step S170). After step S170, the control circuit 44 proceeds to step S148 of FIG. 7. At step S148, the control circuit 44 supplies a low-voltage pulse from the erasure circuit 43 to the display board section 11 to erase any images displayed on the display surface 11D all at once. After that, the control circuit 44 turns off the handwriting input device 1 (step S149).

Advantageous Effects of First Embodiment

When the predetermined operation for visually erasing any images displayed on the display surface 11D of the display board section 11 is performed by operating the operation button 21, the handwriting input device 1 according to the above-described first embodiment erases the electronic data stored in the memory 41 after transmitting the electronic data to the mobile terminal 3, which is an external device. Therefore, at a later time when a new handwritten input is made on the display surface 11D of the display board section 11, the previous electronic data corresponding to the previous handwritten input image(s) has already been erased and does not exist in the memory 41. This configuration prevents new electronic data corresponding to the new handwritten input image(s) from being superimposed on the previous electronic data corresponding to the previous handwritten input image(s).

In the first embodiment, the mobile terminal 3, which is the external device, can easily manage the electronic data transmitted from the handwriting input device 1 in response to the operation on the operation button 21 as the electronic data corresponding to the image(s) displayed on the display surface 11D of the handwriting input device 1. In other words, even if no delimiter (pagination) information is added to the electronic data received from the handwriting input device 1, the mobile terminal 3 can process the received electronic data as data per page corresponding to the image(s) displayed on the display surface 11D of the handwriting input device 1 by, for example, assigning a page number to the received electronic data.

In the first embodiment described above, each time the operation button 21 is operated, the delimiter information is added to the electronic data stored and retained in the memory 41. Therefore, the mobile terminal 3 can easily assign a page number according to the delimiter information.

Further, when the operation button 21 is pressed as the predetermined operation, the handwriting input device 1 according to the above-described first embodiment checks whether or not the electronic data stored and retained in the memory 41 can be transmitted to the mobile terminal 3, which is the external device. After confirming that the electronic data stored and retained in the memory 41 can be transmitted to the mobile terminal 3, the handwriting input device 1 transmits the electronic data and erases the electronic data from the memory 41 after the transmission. This configuration prevents the electronic data corresponding to the handwritten input image(s) from being erased without being transmitted.

Further, the handwriting input device 1 according to the above-described first embodiment performs the above-described series of operations in response to the user pressing the operation button 21 as the predetermined operation for visually erasing any images displayed on the display surface 11D of the display board section 11. This configuration eliminates the need for the user to perform different operations to erase the image(s) displayed on the display surface 11D of the display board section 11 and to transmit the electronic data stored in the memory 41, separately. If the predetermined operation for visually erasing any images displayed on the display surface 11D of the display board section 11 needs to be performed separately from the operation for transmitting the electronic data stored in the memory 41, there is a possibility that the user erases the handwritten input image(s) displayed on the display surface 11D of the display board section 11 but forgets to transmit the electronic data. The configuration according to the above-described first embodiment can prevent such a mistake.

Further, with this configuration, an operation section for the predetermined operation to visually erase any images displayed on the display surface 11D of the display board section 11 need not be provided separately from an operation section to transmit the electronic data stored in the memory 41 in the handwriting input device 1. This is also advantageous in that the configuration of the handwriting input device 1 can be simplified.

Further, when the operation button 21 is pressed as the predetermined operation but the electronic data stored in the memory 41 fails to be transmitted to the mobile terminal 3, which is the external device, the handwriting input device 1 according to the above-described first embodiment stores and retains the electronic data in the memory 41 with the delimiter information added thereto. In this case, the handwriting input device 1 erases any images displayed on the display surface 11D of the display board section 11 but does not erase the electronic data stored in the memory 41. In addition, the handwriting input device 1 uses the indicators 23 and 24 and the beep speaker 25 to notify the user that the communication at this time has failed and the electronic data is still stored in the memory 41.

Through this notification, the user can recognize the status of communication between the handwriting input device 1 and the mobile terminal 3 and the storage status of the memory 41. Accordingly, the user can take appropriate action such as enabling the communication between the handwriting input device 1 and the mobile terminal 3 and long pressing the operation button 21 to transmit the electronic data stored in the memory 41.

When the operation button 21 is pressed as the predetermined operation but the handwriting input device 1 according to the above-described first embodiment cannot transmit the electronic data stored in the memory 41 to the mobile terminal 3, which is the external device, and when it is also determined that the remaining capacity of the memory 41 is not sufficient enough to store electronic data corresponding to a new handwritten input image(s), the handwriting input device 1 warns the user that the erasure of the image(s) displayed on the display surface 11D of the display board section 11 is denied. At this time, the handwriting input device 1 according to the first embodiment blinks the indicators 23 and 24 as a warning and also emits a beep sound from the beep speaker 25 to alert the user.

Since the user is warned in this way, the user can recognize the need for the electronic data stored in the memory 41 to be transmitted to the external device to make the remaining capacity of the memory 41 sufficient enough for a new handwritten input. Accordingly, the user can take appropriate action such as enabling the communication between the handwriting input device 1 and the mobile terminal 3 and long pressing the operation button 21 to transmit the electronic data stored in the memory 41.

Modifications of First Embodiment

In the above-described embodiment, the operation of pressing the operation button 21 is set as the predetermined operation for erasing any images displayed on the display surface 11D of the display board section 11 and transmitting the electronic data from the memory 41. Further, the operation on the operation button 21 set as the predetermined operation is also detected as the operation for turning power on/off. Alternatively, the predetermined operation of the operating button 21 for erasing any images displayed on the display surface 11D of the display board section 11 may be made different from the operation of the operating button 21 for turning power on/off of the handwriting input device 1.

For example, the operation of pressing the operation button 21 for a short period of time equal to or less than the first duration of time may be set as the predetermined operation, while the operation of pressing the operation button 21 for the second duration of time longer than the first duration of time may be set as the operation for turning power on/off. In this case, since the operation of long pressing the operation button 21 is set as the operation for transmitting the electronic data stored in the memory 41 that has not been transmitted in the above-described embodiment, the operation for transmitting the electronic data stored in the memory 41 needs to be differentiated from the operation for turning power on/off. For example, the operation of pressing the operation button 21 two consecutive times during a short period of time equal to or less than the first duration of time may be set as the operation for transmitting the electronic data stored in the memory 41.

In the above-described embodiment, the operation button 21 for performing the predetermined operation for erasing any images displayed on the display surface 11D of the display board section 11 also serves as the power supply button. Alternatively, a different operation button may serve as the power supply button.

In the above-described embodiment, the memory 41 has a capacity for storing multiple pages of the images displayed on the display surface 11D of the display board section 11 of the handwriting input device 1. Alternatively, the memory 41 may have a capacity for storing one page of the image(s) displayed on the display surface 11D of the display board section 11 of the handwriting input device 1. In such a case, every time the electronic data stored in the memory 41 fails to be transmitted even though the operation button 21 is pressed, the handwriting input device 1 warns the user that the erasure of the image(s) displayed on the display surface 11D of the display board section 11 is denied. At this time, the handwriting input device 1 blinks the indicators 23 and 24 as a warning and also emits a beep sound from the beep speaker 25 to alert the user.

In this way, when the memory 41 has a capacity for storing one page of the image(s) displayed on the display surface 11D of the display board section 11 of the handwriting input device 1, the handwriting input device 1 transmits the electronic data corresponding to one page of the image(s) displayed on the display surface 11D to the mobile terminal 3. Therefore, even if no delimiter information is added to the electronic data, the mobile terminal 3 can add information such as a page number indicating a delimiter each time the mobile terminal 3 receives the electronic data. In other words, this is advantageous for the handwriting input device 1 since the handwriting input device 1 does not need to add the delimiter information to the electronic data stored in the memory 41.

In the above-described embodiment, each of the indicators 22 to 24, which include the semiconductor light-emitting elements, is a light-emitting element capable of emitting a single color and indicates different statuses by differentiating the light-emitting mode such as lighting and blinking. Alternatively, each of the indicators 22 to 24 may be a light-emitting element capable of emitting different colors. In this case, each of the indicators 22 to 24 may indicate different statuses by differentiating the light-emitting mode, that is, by emitting different colors.

Second Embodiment

In the above-described first embodiment, the operation of pressing the operation button 21 is set as the predetermined operation for erasing any images displayed on the display surface 11D. As another example, a handwriting input device according to a second embodiment is not provided with such an operation button but has a predetermined position range within the position detection area of the position detection sensor and uses an indication input operation by the electronic pen thereto as the predetermined operation.

Figure 9:
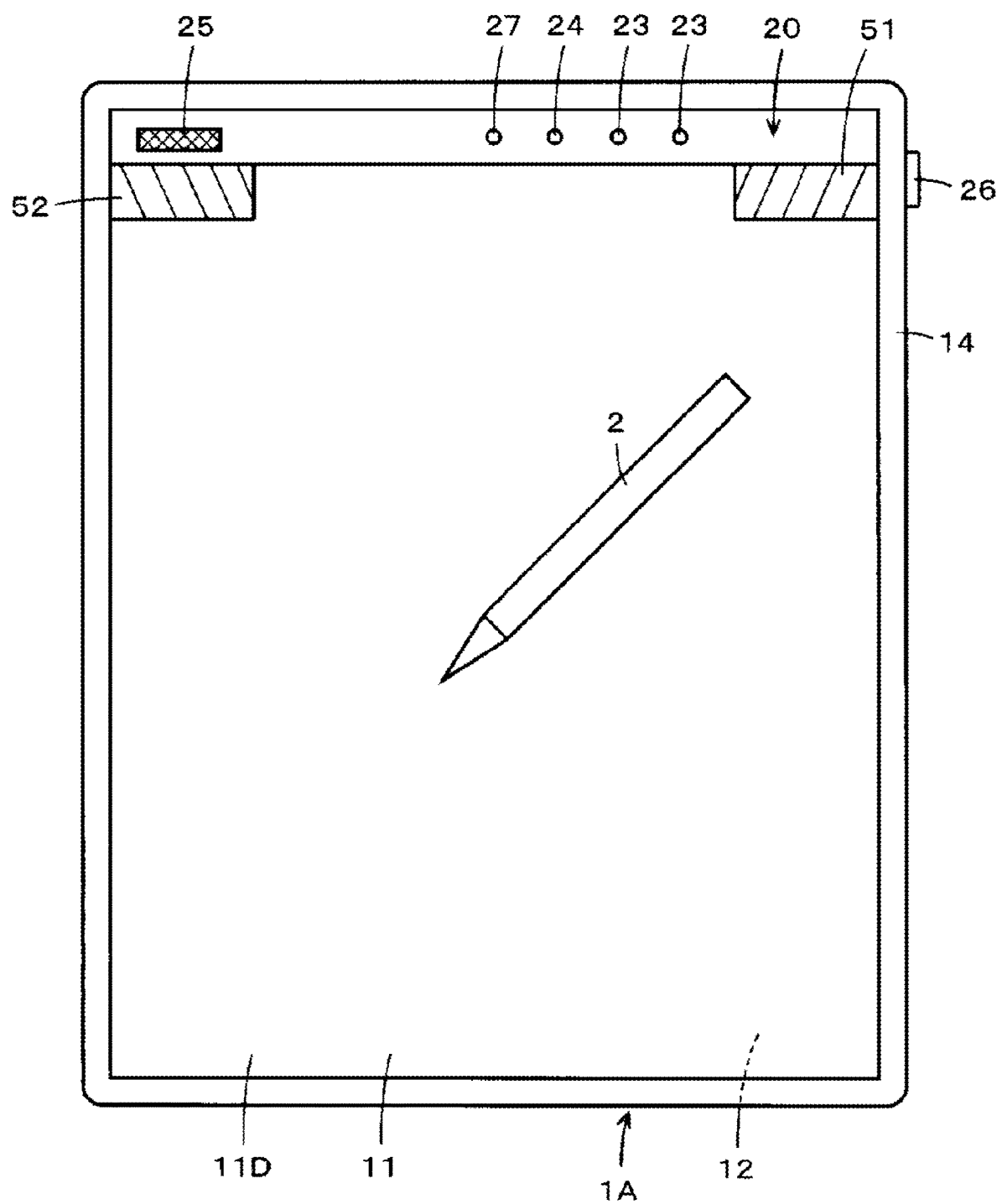
FIG. 9 is a view for describing an example of a configuration of a handwriting input device according to a second embodiment of the present disclosure.

FIG. 9 is a view for describing a handwriting input device 1A according to the second embodiment. The handwriting input device 1A according to the second embodiment has a similar configuration to that of the handwriting input device 1 according to the first embodiment except that the handwriting input device 1A is not provided with the operation button 21 as a hardware configuration but has the predetermined position range within the position detection area of the position detection sensor and uses an indication input operation by the electronic pen thereto as the predetermined operation. In the following description, parts similar to those of the handwriting input device 1 according to the first embodiment will be described using the same reference signs.

FIG. 9 is a view of the handwriting input device 1A according to the second embodiment as viewed from above in the direction orthogonal to the display surface 11D thereof. In the handwriting input device 1A according to the second embodiment as well, the position detection sensor 12 is disposed on the back side of the display board section 11 such that the position detection area of the position detection sensor 12 is superimposed on the display area of the display surface 11D.

In the second embodiment, as illustrated in FIG. 9, a power supply button 26 is disposed on a side of the case 14. Each time the power supply button 26 is operated, the handwriting input device 1A is alternately turned on and off under the control of the control circuit 44 of the device control circuit 40.

In the second embodiment as well, the panel 20 is disposed on the upper side of the display surface 11D and outside the display area of the display surface 11D as illustrated in FIG. 9. As in the first embodiment, the power indicator 22, the communication indicator 23, the memory indicator 24, and the beep speaker 25 are also disposed on the panel 20.

In the second embodiment, there is a rectangular area in the display area of the display surface 11D. In this example, the rectangular area is located in an upper right end portion of the display area in the vicinity of the panel 20. This rectangular area serves as a predetermined operation acceptance area 51, which accepts a predetermined operation for erasing any images displayed on the display surface 11D as an operation using the electronic pen 2. In this example, the control circuit 44 of the device control circuit 40 recognizes an indication input made by the electronic pen 2 for a short period of time, that is, a one-tap operation by the electronic pen 2, to any of the positions within the predetermined operation acceptance area 51 as the predetermined operation for erasing any images displayed on the display surface 11D.

In the above-described first embodiment, the control circuit 44 recognizes the operation of long pressing the operation button 21 as the operation for indicating the transmission of the electronic data retained in the memory 41 that has not been transmitted. In the handwriting input device 1A according to the second embodiment, the control circuit 44 recognizes multiple indication inputs, for example, two consecutive inputs, made by the electronic pen 2 in a short period of time, that is, a double-tap operation, within the predetermined operation acceptance area 51 as the operation for indicating the transmission of the electronic data retained in the memory 41 without being transmitted.

Since the processing operations of the control circuit 44 according to these indication input operations using the electronic pen 2 are similar to those in the first embodiment, the description thereof is omitted here.

The indication input operations by the electronic pen 2 in the predetermined operation acceptance area 51 are not limited to the one-tap and double-tap operations. Any indication input operations are acceptable as long as the control circuit 44 can distinguish between the indication input operations. Another possible configuration is not to dispose the power supply button 26. In this case, an indication input operation by the electronic pen 2, which can be distinguished from the other indication input operations by the electronic pen 2, in the predetermined operation acceptance area 51 may be configured to be recognized as the operation for turning power on/off.

Further, in the handwriting input device 1A according to the second embodiment, the operation and non-operation of the device control circuit 40 is controllable. In the handwriting input device 1A according to the second embodiment, in order to accept a control indication by the user indicating the operation or non-operation of the device control circuit 40, a rectangular area, which is, in this example, located in an upper left end portion of the display area in the vicinity of the panel 20, serves as a control indication acceptance area 52, which accepts the control indication by the user as an indication input operation using the electronic pen 2.

In the handwriting input device 1A according to the second embodiment, as illustrated in FIG. 9, an indicator 27 is disposed on the panel 20 to notify the user of the operation status (on or off) of the device control circuit 40. In this example, the indicator 27 also includes a semiconductor light-emitting element as with the indicators 22 to 24.

In the handwriting input device 1A according to the second embodiment, each time an indication input operation is made by the electronic pen 2 within the control indication acceptance area 52, the control circuit 44 of the device control circuit 40 controls the supply of a power supply voltage to the device control circuit 40 so as to alternately switch the operation and non-operation of the device control circuit 40. Note that as in the first embodiment, even when the device control circuit 40 is in the non-operation state, the control circuit 44 is in the standby state and is supplied with the power supply voltage at all times.

In the handwriting input device 1A according to the second embodiment, when the power supply voltage is supplied to the device control circuit 40 and the operation of the device control circuit 40 is turned on, the control circuit 44 switches on the indicator 27. When the operation of the device control circuit 40 is turned off, the control circuit 44 switches off the indicator 27.

Accordingly, the handwriting input device 1A according to the second embodiment can realize a use mode in which battery consumption can be reduced in a situation where an image is formed and displayed on the display surface 11D of the display board section 11 but the electronic data of the image does not need to be transferred to the external device.

Modifications of Second Embodiment

The display surface 11D of the display board section 11 may be configured so as not to include the predetermined operation acceptance area 51 and the control indication acceptance area 52. Only the position detection area of the position detection sensor 12 may be configured which contains the predetermined operation acceptance area 51 and the control indication acceptance area 52.

Instead of the position detection sensor 12 detecting the indication inputs to the predetermined operation acceptance area 51 and the control indication acceptance area 52, sensors such as pressure sensors or touch sensors may be separately disposed so as to correspond to the positions of the predetermined operation acceptance area 51 and the control indication acceptance area 52, thereby detecting operations on their respective areas. In this case, operation inputs to the predetermined operation acceptance area 51 and the control indication acceptance area 52 may include not only operation inputs by the electronic pen 2 but also operation inputs by a user's finger.

In this case, the operation inputs do not need to be detected by the position detection sensor 12. Therefore, the above-described control indication to the control indication acceptance area 52 can control not only power supply to the device control circuit 40 but also power supply to the position detection sensor 12 and the position detection circuit 30, thereby controlling on and off of the operation thereof. This configuration can realize a use mode in which battery consumption can be further reduced in a situation where an image is formed and displayed on the display surface 11D of the display board section 11 but the electronic data of the image does not need to be transferred to the external device.

Example of Use Mode of Handwriting Input Device

Below is an example of an application where the handwriting input device 1 or 1A according to the above-described embodiments can be suitably used. First, the user prepares for a transparent sheet on which a predetermined document form is printed, places the transparent sheet on the display surface 11D of the handwriting input device 1 or 1A, and makes a handwritten input to the document form printed on the transparent sheet.

Figure 10:
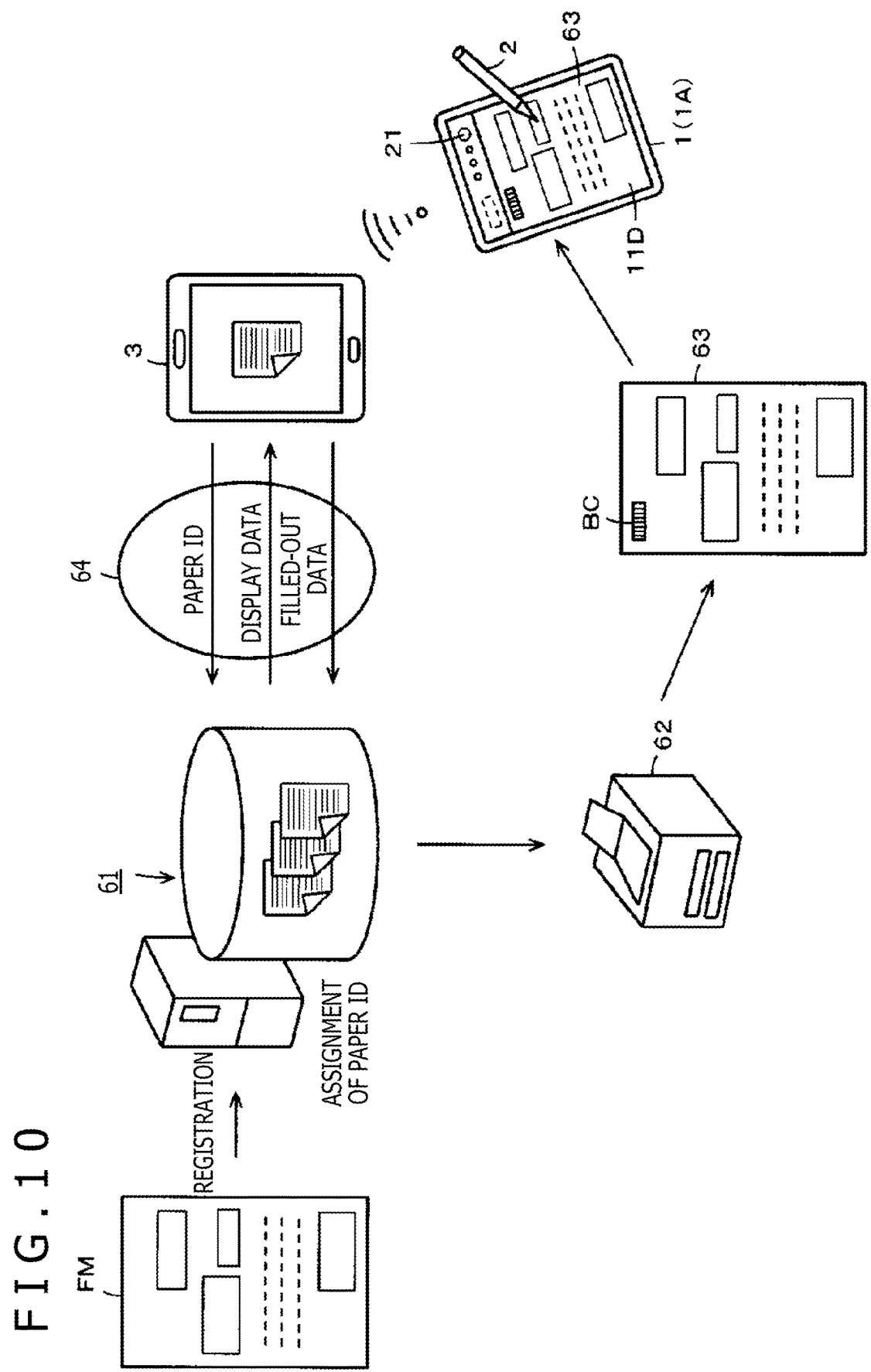
FIG. 10 is a diagram for describing an example of a configuration of a system using the handwriting input device according to the first or second embodiment of the present disclosure.

FIG. 10 is a diagram illustrating an example of a configuration of a system that realizes this use application. The user of this system creates a desired document form FM and registers the document form FM in a server device 61, which includes, for example, a PC.

The server device 61 accepts this registration, assigns identification information (paper ID) to the accepted document form, and stores data of the document form in a database. In this case, the server device 61 assigns unique identification information, for example, a barcode, as the paper ID.

The data of the document form stored in the database of the server device 61 includes, for example, area coordinate data, which indicates a handwritten information input area where handwritten information is to be input, and attribute data of the information to be input to the handwritten information input area. The area coordinate data, which indicates the handwritten information input area included in the document form, corresponds to the coordinate data of the position detection area of the position detection sensor 12 of the handwriting input device 1 or 1A.

The registered document form is then printed on a transparent sheet 63 by a printer 62. In this case, in this example, the barcode as an example of the paper ID assigned by the server device 61 is printed at a predetermined position on the transparent sheet 63. The transparent sheet 63 is placed on the display surface 11D of the handwriting input device 1 or 1A. In this case, the handwriting input device 1 or 1A according to this example includes a section, for example, a clip member (not illustrated), to lock the transparent sheet 63 on the display surface 11D. The clip member locks the transparent sheet 63 on the display surface 11D. In addition, the handwriting input device 1 or 1A according to this example further includes a barcode reader (not illustrated) that reads the barcode printed on the transparent sheet 63. The control circuit 44 of the device control circuit 40 stores the barcode information read by the barcode reader in the memory 41 as the paper ID in association with the electronic data.

In this state, the user of the handwriting input device 1 or 1A makes a handwritten input in an input-requiring area of the document form on the transparent sheet 63 by using the electronic pen 2. In response, an image corresponding to the handwritten input is formed and displayed on the display surface 11D of the display board section 11. At the same time, the position of the pen tip of the electronic pen 2 is detected by the position detection sensor 12, and electronic data corresponding to the handwritten input image is stored in the memory 41.

When the user finishes required handwritten input and presses the operation button 21, the control circuit 44 of the device control circuit 40 of the handwriting input device 1 checks whether or not communication with the mobile terminal 3 is possible. After confirming that communication with the mobile terminal 3 is possible, the control circuit 44 transmits the electronic data stored in the memory 41 to the mobile terminal 3 with the paper ID added to the electronic data. After the transmission is completed, the control circuit 44 performs a process of erasing any images displayed on the display surface 11D. In response, the handwritten input images written in their respective input fields of the document form on the transparent sheet 63 are erased, making each of the input fields of the document form blank. In this state, the next user can make a handwritten input in each of the blank fields of the same document form.

In this example, the mobile terminal 3 includes an application program installed therein in advance to perform necessary processes in this system. When the mobile terminal 3 receives the paper ID and the electronic data from the handwriting input device 1 or 1A, the mobile terminal 3 stores the paper ID and the electronic data in a buffer memory and transmits the received paper ID information to the server device 61 through a communication network 64.

In response, the mobile terminal 3 receives display data of the document form corresponding to the paper ID from the server device 61. The mobile terminal 3 displays the document form according to the display data on a display screen and at the same time displays the handwritten input information in each of the blank fields of the document form, on the basis of the electronic data received from the handwriting input device 1 or 1A.

After that, on the basis of, for example, a transfer indication from the user of the mobile terminal 3, the mobile terminal 3 transmits the electronic data received from the handwriting input device 1 or 1A and stored in the buffer memory to the server device 61 with the paper ID added to the electronic data and requests the server device 61 to store the filled-out data. At this time, a page number and a time stamp are added to the electronic data to be transmitted from the mobile terminal 3 to the server device 61. In this way, the server device 61 can discriminate different pieces of handwritten input information in the same document forms on the basis of their page numbers and time stamps. The server device 61 stores the electronic data associated with the paper ID received from the mobile terminal 3 in a handwritten information storage section in association with the received paper ID.

In this way, in the system according to this embodiment illustrated in FIG. 10 with the handwriting input device 1 or 1A, the user can place the transparent sheet 63 on which the predetermined document form is printed on the display surface 11D, and the system can collect handwritten input information in each of the input fields required in this document form as electronic data. In this case, the system can recognize the document form by the paper ID and manage the electronic data based on the delimiter information such as a page number. Therefore, this system is highly effective in applications where a handwritten input is required in each given input field of a specific document form such as a medical questionnaire at a hospital or a membership registration sheet at a store, for example. In conventional practice where paper on which the document form is printed needs to be filled out, the user needs to replace the paper. However, the system illustrated in FIG. 10 advantageously eliminates the need for such paper replacement since this system uses a transparent sheet. Further, although conventional practice requires management of paper on which personal information is written, the handwritten input information displayed on the display surface 11D of the display board section 11 is erased later in the example illustrated in FIG. 10. This advantageously eliminates the need for the above-described conventional paper management for protection of personal information.

Other Embodiments or Modifications

According to the above-described first and second embodiments, the display section of the handwriting input device includes the display board section using the pressure-sensitive cholesteric liquid crystal layer. However, the display section is not limited to this example.

Figure 11A:
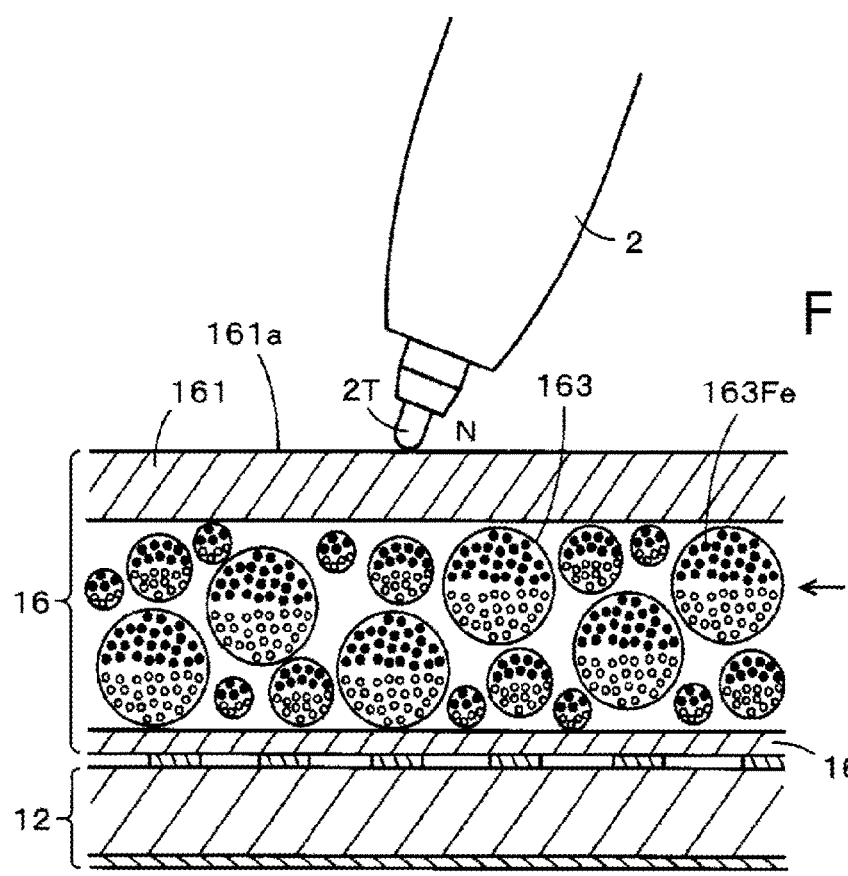
FIGS. 11A and 11B are diagrams for describing another example of a configuration of a display section of a handwriting input device according to an embodiment of the present disclosure.

For example, the display section may include a magnetic sheet 16 illustrated in FIG. 11A. In this case, as illustrated in FIG. 11A, the position detection sensor 12 is disposed on a lower side (on a back side) of the magnetic sheet 16 so as to be superimposed on the magnetic sheet 16 in a direction orthogonal to a display surface.

As illustrated in FIG. 11A, the magnetic sheet 16 is formed in a sheet in which a large number of microcapsules 163 are confined in a gap between a sheet-like resin base material 161 and a sheet-like resin base material 162, which are made of polyethylene terephthalate (PET), for example. In each of the microcapsules 163, magnetic material powers, for example, iron powders 163Fe (depicted as black dots in FIGS. 11A and 11B) are confined in such a way as to be able to migrate. Further, at least the sheet-like resin base material 161 is a transparent material.

Figure 11B:
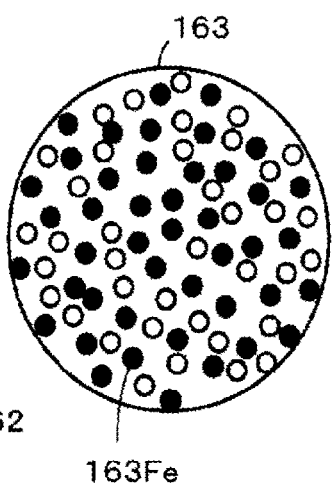

In the present embodiment, a front surface 161a of the sheet-like resin base material 161 of the magnetic sheet 16 serves as the display surface. When a magnetic pole is not close to or in contact with the magnetic sheet 16, the iron powders 163Fe in each microcapsule 163 are present in irregular random positions as illustrated in FIG. 11B. In this state, the entire front surface 161a, that is, the entire display surface of the magnetic sheet 16 exhibits a predetermined base color, for example, white.

When the magnetic pole comes close to or comes in contact with the front surface 161a of the sheet-like resin base material 161 of the magnetic sheet 16, the iron powders 163Fe in the microcapsules 163 in the vicinity of the position where the magnetic pole comes close or comes in contact are attracted to the magnetic pole side, as illustrated in FIG. 11A. Therefore, the front surface 161a, that is, the display surface of the magnetic sheet 16 exhibits the color of the iron powders 163Fe, for example, black at the position where the magnetic pole comes close or comes in contact. The positions of the iron powders 163Fe in the microcapsules 163 are maintained even after the magnetic pole moves away. Therefore, as the magnetic pole that comes close to or comes in contact with the front surface 161a of the magnetic sheet 16 moves, the trajectory of the movement appears as a black line on the front surface 161a of the magnetic sheet 16.

In this example, a core body 2T of the electronic pen 2 includes a magnetic pole (e.g., N-pole) at least at a tip end thereof. Therefore, when a handwritten input is made by the electronic pen 2 on the magnetic sheet 16, the movement trajectory of the handwritten input appears on the front surface 161a (display surface) of the magnetic sheet 16. The position where the handwritten input is made is detected by the position detection sensor 12, and electronic data is generated accordingly.

The handwriting input device according to this example includes an eraser (not illustrated) that returns the state of the iron powders 163Fe in the microcapsules 163, which have been magnetically attracted to the front surface 161a of the magnetic sheet 16 of the display section, to the state where the iron powders 163Fe are in the irregular positions illustrated in FIG. 11B. In this example, the eraser is capable of erasing, all at once, any images displayed on the entire display area of the magnetic sheet 16.

Instead of the magnetic sheet 16 illustrated in the example of FIG. 11A, an electrophoresis sheet-like member can be used, in which positively charged particles and negatively charged particles are confined in microcapsules and which displays an image through an electrophoresis display method.

In this case, the electrophoresis sheet-like member includes an upper electrode and a lower electrode. A display image is formed in response to an electric field applied between these electrodes. In this example, when the position indicated by the electronic pen 2 is detected by the position detection sensor 12, the electric field at the position corresponding to the detected position on the electrophoresis sheet-like member is controlled so as to generate a display image.

Then, for example, in response to an operation on an erasure operation button or an input operation to an erasure indication area within the detection area of the position detection sensor 12, an electric field for erasure is supplied between the upper electrode and the lower electrode so as to erase any display images all at once.

When the electrophoresis sheet-like member is used, display information corresponding to a document form can be displayed separately from images corresponding to detection outputs of the position detection sensor 12. Then, after display images are erased all at once, the document form is displayed prior to a handwritten input. In this way, it is possible to realize a use case similar to the one realized by the system illustrated in FIG. 10. The advantage of this example is that the transparent sheet is also unnecessary.

Although the position detection sensor 12 is of the electromagnetic induction type in the above-described embodiments, it goes without saying that the position detection sensor 12 may be a sensor employing another position detection method. For example, the position detection sensor 12 may be of an active capacitive coupling type.

It is to be noted that the embodiments of the present disclosure are not limited to the foregoing embodiments, and that various changes can be made without departing from the scope of the present disclosure.

The invention claimed is:

1. A handwriting input device comprising:
    a display section which includes a display surface and which, in operation, displays handwritten input information that is handwritten on the display surface;
    a position detection sensor which is disposed such that a position detection area of the position detection sensor is superimposed on a display area of the display surface and which, in operation, detects a position corresponding to the handwritten input information;
    a memory which, in operation, stores electronic data according to the position that corresponds to the handwritten input information and that has been detected by the position detection sensor;
    a transmission circuit which, in operation, transmits the electronic data stored in the memory to an external device; and
    a control circuit which, in operation, controls the transmission of the electronic data stored in the memory to the external device via the transmission circuit,
    wherein the display section, in response to a handwritten input operation performed on the display surface, displays the handwritten input information on the display surface, and
    the control circuit, in response to receiving a predetermined operation by the user to visually erase the handwritten input information displayed on the display surface,
        check whether or not the transmission to the external device via the transmission circuit is possible,
        responsive to determining the transmission to the external device is possible, transmit the electronic data stored in the memory to the external device via the transmission circuit and erase the electronic data from the memory after the transmission, and
        responsive to determining that the transmission to the external device is not possible, disable erasing of the electronic data from the memory.

2. The handwriting input device according to claim 1, wherein the predetermined operation is an operation on an operation element which is disposed on the handwriting input device and which, in operation, controls a power supply to the handwriting input device.

3. The handwriting input device according to claim 2, wherein, while the handwriting input device is being supplied with power, the predetermined operation is performed by operating the operation element in a different way from operating the operation element to control the power supply to the handwriting input device.

4. The handwriting input device according to claim 3, wherein the power supply to the handwriting input device is controlled by operating the operation element for a first duration of time, and
    the predetermined operation is performed by operating the operation element for a second duration of time shorter than the first duration of time.

5. The handwriting input device according to claim 1, further comprising:
    a first operation element which, in operation, controls a power supply to the handwriting input device; and
    a second operation element different from the first operation element,
    wherein the predetermined operation is an operation on the second operation element according to which any handwritten input information displayed on the display surface of the display section is visually erased.

6. The handwriting input device according to claim 5, wherein the operation on the second operation element is detected by the position detection sensor.

7. The handwriting input device according to claim 6, wherein the position detection sensor is a sensor which, in operation, detects a predetermined pressure, and
    the operation on the second operation element is recognized by the detection of the predetermined pressure.

8. The handwriting input device according to claim 6, wherein the operation on the second operation element to be detected by the position detection sensor is performed on an end portion of the position detection area of the position detection sensor.

9. The handwriting input device according to claim 1, wherein the predetermined operation is an operation performed on an end portion of the position detection area of the position detection sensor.

10. The handwriting input device according to claim 9, wherein the predetermined operation is a gesture operation.

11. The handwriting input device according to claim 1, further comprising:
    a display erasing operation element, wherein micromagnets are arranged so as to correspond to the display surface of the display section, a change in an orientation of the micromagnets in response to the handwritten input operation causes the handwritten input information displayed on the display surface to be visually displayed, the display erasing operation element, in operation, changes the orientation of the micromagnets to a same direction, and the predetermined operation is an operation on the display erasing operation element.

12. The handwriting input device according to claim 11, further comprising:

an operation element which is different from the display erasing operation element and which, in operation, controls a power supply to the position detection sensor.

13. The handwriting input device according to claim 1, further comprising:

an information erasing operation element, wherein a liquid crystal layer is disposed in the display section so as to face the display surface, a change in an arrangement of liquid crystal molecules of the liquid crystal layer in response to a pressure applied to the display surface causes the handwritten input information to be formed and retained on the display surface, the information erasing operation element, in operation, applies a predetermined voltage to the liquid crystal layer so as to align the liquid crystal molecules of the liquid crystal layer to a predetermined arrangement and visually erase any handwritten input information displayed on the display surface, and the predetermined operation is an operation on the information erasing operation element.

14. The handwriting input device according to claim 1, wherein, responsive to determining that the transmission to the external device is not possible, the control circuit performs control so as to visually retain any handwritten input information displayed on the display surface.

15. The handwriting input device according to claim 1, wherein the control circuit, in operation, checks whether or not the transmission to the external device via the transmission circuit is possible according to a pairing procedure performed between the transmission circuit and the external device.

16. The handwriting input device according to claim 1, wherein the control circuit, in operation, sets, in response to the predetermined operation, delimiter information to the electronic data stored in the memory.

17. The handwriting input device according to claim 1, wherein, responsive to determining that the transmission to the external device is not possible, the control circuit performs control so as to set delimiter information to the electronic data corresponding to the handwritten input operation performed on the display surface.

18. The handwriting input device according to claim 1, further comprising:

a status notification circuit including at least one semiconductor light-emitting element, which, in operation, indicates a status of the handwriting input device, wherein the at least one semiconductor light-emitting element has at least one of a configuration for emitting a plurality of colors or a configuration for allowing selection of a plurality of types of light-emitting modes, and an operation status of the handwriting input device and a storage status of the electronic data stored in the memory are presented visually differently from each other by the at least one semiconductor light-emitting element.

19. The handwriting input device according to claim 18, wherein the status notification circuit, in operation, presents the operation status of the handwriting input device and the storage status of the electronic data stored in the memory visually differently from each other by using the at least one semiconductor light-emitting element according to whether or not the transmission to the external device via the transmission circuit is possible.

20. The handwriting input device according to claim 18, wherein the storage status of the electronic data stored in the memory, which is presented by the status notification circuit, includes a status in which the electronic data stored in the memory has been transmitted to the external device and a status in which the electronic data is retained in the memory.

* * * * *